(12) United States Patent
Lohr

(10) Patent No.: US 11,563,513 B1
(45) Date of Patent: Jan. 24, 2023

(54) LOW-LATENCY WIRELESS DISPLAY SYSTEM

(71) Applicant: Valve Corporation, Bellevue, WA (US)

(72) Inventor: Charles N. Lohr, Bellevue, WA (US)

(73) Assignee: Valve Corporation, Bellevue, WA (US)

( * ) Notice: Subject to any disclaimer, the term of this patent is extended or adjusted under 35 U.S.C. 154(b) by 65 days.

(21) Appl. No.: 17/015,881

(22) Filed: Sep. 9, 2020

Related U.S. Application Data

(60) Provisional application No. 62/898,482, filed on Sep. 10, 2019.

(51) Int. Cl.
| | | |
|---|---|---|
| *A63F 13/327* | (2014.01) |
| *H04L 1/00* | (2006.01) |
| *H04L 12/18* | (2006.01) |
| *G09G 5/36* | (2006.01) |
| *H04W 52/32* | (2009.01) |
| *H04L 67/131* | (2022.01) |
| *A63F 13/35* | (2014.01) |
| *G06F 3/01* | (2006.01) |

(52) U.S. Cl.
CPC ............ *H04L 1/0009* (2013.01); *G09G 5/36* (2013.01); *H04L 1/0003* (2013.01); *H04L 1/0022* (2013.01); *H04L 1/0042* (2013.01); *H04L 12/1868* (2013.01); *H04L 67/131* (2022.05); *H04W 52/322* (2013.01); *A63F 13/35* (2014.09); *G06F 3/012* (2013.01); *G06F 3/013* (2013.01); *G09G 2340/02* (2013.01); *G09G 2370/10* (2013.01); *G09G 2370/16* (2013.01)

(58) Field of Classification Search
None
See application file for complete search history.

(56) References Cited

U.S. PATENT DOCUMENTS

| | | | |
|---|---|---|---|
| 10,063,261 B1 * | 8/2018 | Croxall, II | H04L 1/0041 |
| 2014/0253570 A1 * | 9/2014 | Tripathi | G06T 1/60 345/531 |
| 2021/0125580 A1 * | 4/2021 | Liu | H03M 7/30 |

* cited by examiner

*Primary Examiner* — Damon J Pierce
(74) *Attorney, Agent, or Firm* — Lee & Hayes, P.C.

(57) ABSTRACT

Described herein are, among other things, techniques, devices, and systems for streaming pixel data from a host computer to a wireless display device with low latency. In some embodiments, a user mode driver is executed in user mode of the host computer to configure a wireless network interface controller of the host computer to operate in a low latency manner. The display device may use a Forward Error Correction (FEC) algorithm to reconstruct a frame from the data packets it receives from the host computer. Also disclosed are techniques for scrambling the transmission of a series of data packets using different antenna configurations, as well as setting a modulation and coding scheme (MCS) rate based at least in part on the amount of pixel data to be transmitted to the display device. The display device may comprise a head-mounted display (HMD) that renders virtual reality (VR) game imagery.

20 Claims, 10 Drawing Sheets

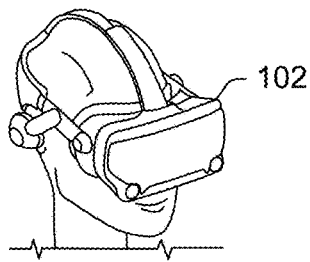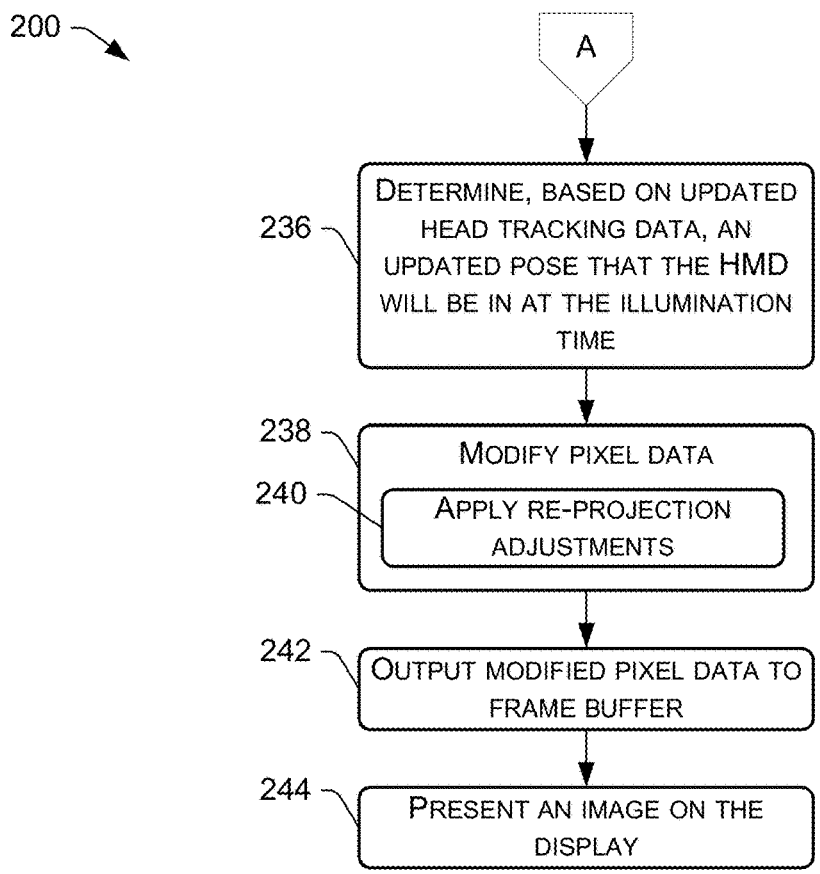
FIG. 2B

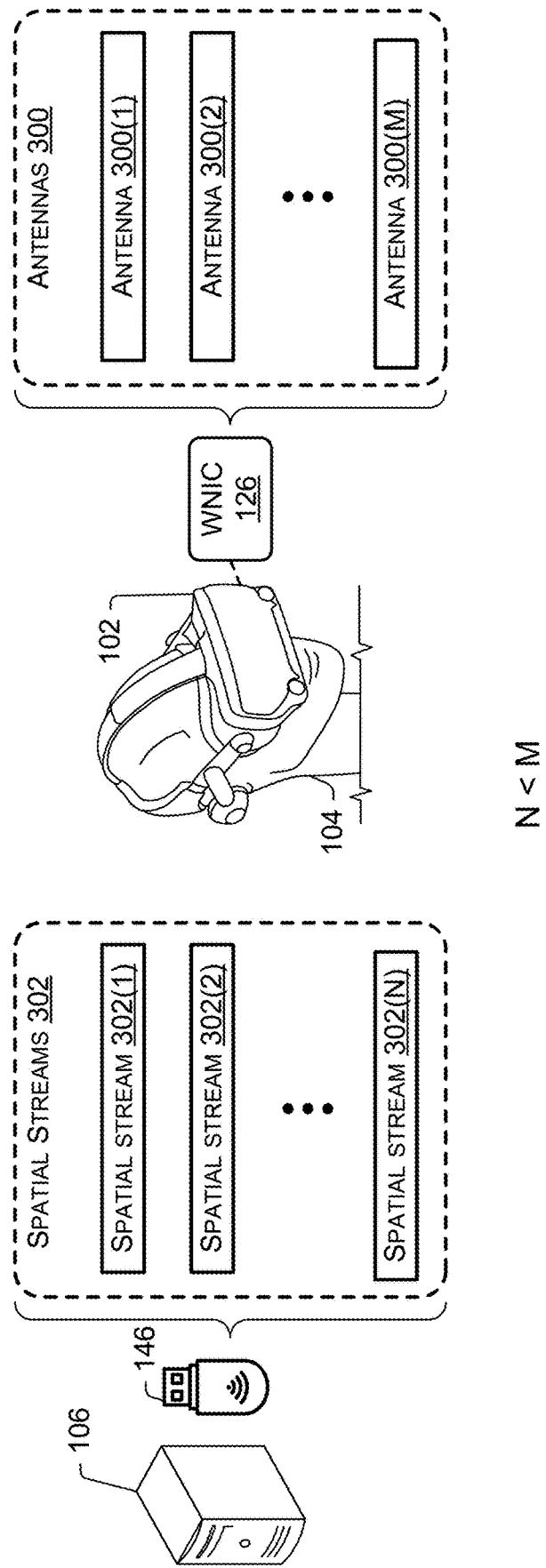

under the US 11,563,513 B1 heading]

LOW-LATENCY WIRELESS DISPLAY SYSTEM

CROSS REFERENCE TO RELATED APPLICATION

This application claims priority to commonly assigned, U.S. Provisional Patent Application Ser. No. 62/898,482, filed Sep. 10, 2019. Application Ser. No. 62/898,482 is fully incorporated herein by reference.

BACKGROUND

Wireless streaming technology is used both within and outside of the video game industry. In the video game industry, some virtual reality (VR) gaming systems utilize wireless streaming technology in order to leverage the high-computing capacity of a host computer for executing a video game, while providing a wearer of a wireless VR headset with greater mobility, as compared to a tethered (non-wireless) headset.

Despite these advantages, significant latency is built into such wireless systems at many levels. For example, 802.11 stacks implement a guaranteed packet delivery mechanism that involves frequently retrying packet transmission for failed transmission attempts, as well as confirming packet delivery based on an acknowledgement (802.11 ACK message) from the receiver. However, this guaranteed packet delivery approach results in added latency because much time is spent retransmitting packets and waiting for ACKs, which is undesirable for systems that stream real-time content (e.g., video games). For instance, a VR gaming system may try to compensate for latency (e.g., a late-arriving frame) by inserting a phantom frame, else frame hitching may occur.

Provided herein are technical solutions to improve and enhance these and other systems.

BRIEF DESCRIPTION OF THE DRAWINGS

The detailed description is described with reference to the accompanying drawings. In the figures, the left-most digit(s) of a reference number identifies the figure in which the reference number first appears. The use of the same reference numbers in different figures indicates similar or identical components or features.

FIGS. 2A and 2B illustrates a flow diagram of an example process for wirelessly streaming data from a host computer to a HMD, in accordance with embodiments disclosed herein.

FIG. 3 illustrates a HMD having a greater number of antennas than a number of spatial streams utilized by a wireless network interface controller (WNIC) associated with a host computer, in accordance with embodiments disclosed herein.

DETAILED DESCRIPTION

Figure 1:
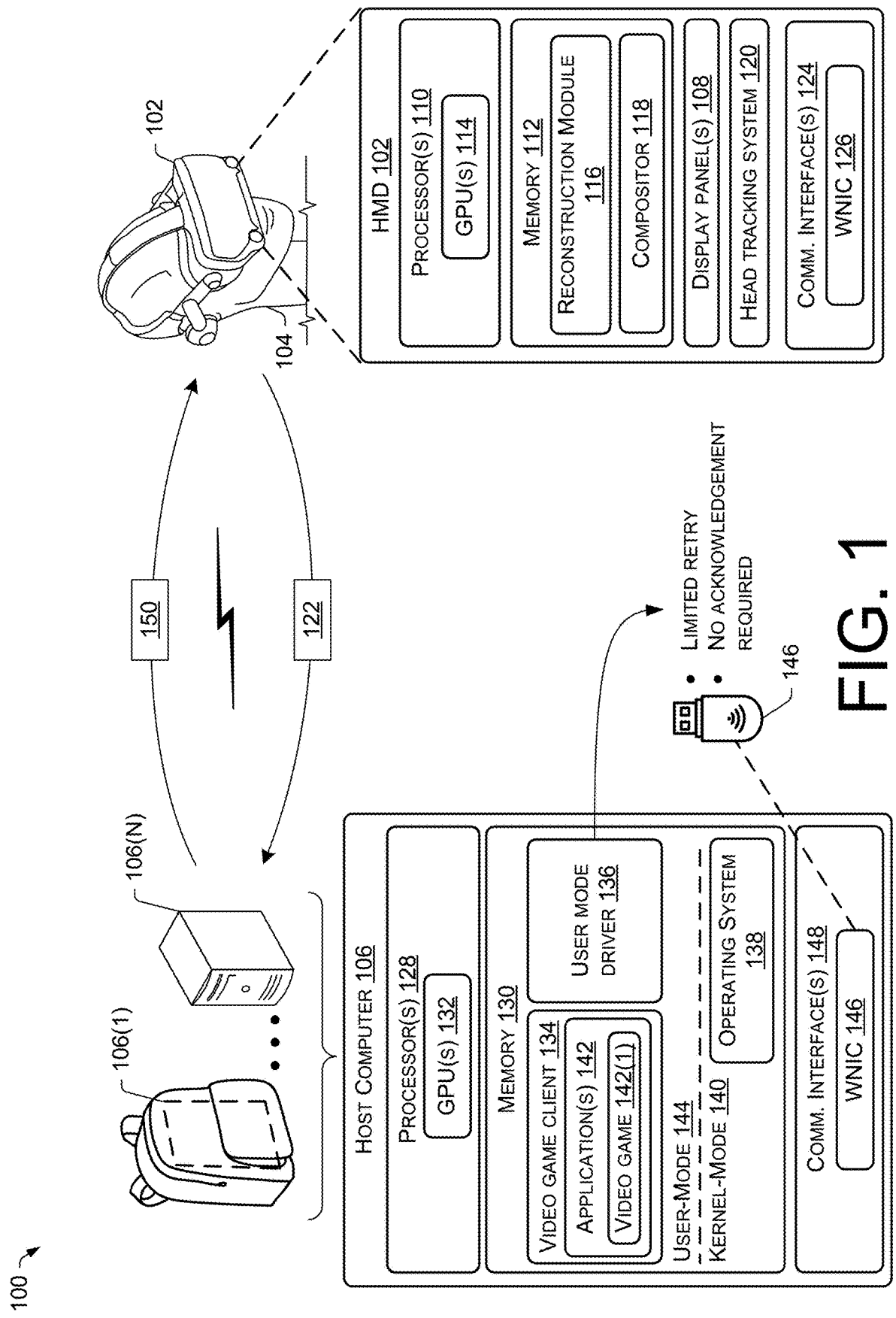
FIG. 1 is a diagram illustrating an example low-latency wireless display system including a head-mounted display (HMD) and a host computer, in accordance with embodiments disclosed herein.

Described herein are, among other things, techniques, devices, and systems for streaming pixel data from a host computer to a wireless display device with low latency between user action and user perception. In some embodiments, the time period between user action and user perception is reduced at least in part by reducing the time it takes the host computer to deliver packets to the wireless display device, thereby increasing the likelihood that packets will be delivered in a timely manner to the wireless display device, which is particularly beneficial when streaming real-time content, such as video game content. For instance, unlike prerecorded content, real-time content cannot be streamed in advance and buffered on the client until the content is ready to be displayed. Instead, frames are rendered milliseconds before the content is displayed based on data received from the display device.

While the forthcoming description is not limited to gaming systems, or even to virtual reality (VR) systems, many of the examples described herein pertain to a VR gaming system that includes a host computer and a wireless head-mounted display (HMD) communicatively coupled thereto. It is to be appreciated, however, that a HMD is just one example of a "display device" that can be utilized for displaying streamed content, and other types of display devices are contemplated herein. In HMD systems, the HMD may be worn by a user for purposes of immersing the user in a VR environment or an augmented reality (AR) environment, as the case may be. One or more display panels of the HMD are configured to present images based on data generated by an application (e.g., a video game). The application executes on the host computer and generates pixel data for individual frames of a series of frames. The pixel data is compressed and sent (or transmitted) wirelessly from the host computer to the HMD to present images that are viewed by a user through the optics included in the HMD, making the user perceive the images as if the user was immersed in a VR or AR environment.

In some embodiments, the HMD is configured to send head tracking data to the host computer, and the host computer is configured to use the head tracking data to generate the pixel data for a given frame. For example, the host computer may use the head tracking data to generate pose data indicative of a predicted pose that the HMD will be in at a time at which light emitting elements of the display panel(s) of the HMD will illuminate for the frame. This pose data may be input to the executing application (e.g., a video game) to generate the pixel data for a given frame. In general, the HMD may receive the compressed pixel data from the host computer and display an image on the HMD's display panel(s) based on the pixel data. In some embodiments, the HMD may utilize various techniques, such as error correction (e.g., forward error correction (FEC)) to reconstruct pixel data, as needed, and/or re-projection to modify the pixel data before rendering the final image, as will be described in more detail below.

A wireless network interface controller (WNIC) may be included in, or coupled to, the host computer for transmitting data packets to the display device (e.g., the HMD). The data packets carry data (e.g., the compressed pixel data) used by the display device (e.g., the HMD) to render imagery thereon. The WNIC may be disposed within a housing of the host computer (e.g., a host computer with a built-in WNIC), or, the WNIC may comprise a Universal Serial Bus (USB) (e.g., USB 2.0) wireless adapter, such as a USB dongle, that is configured to plug into a USB port on the host computer. In this sense, the WNIC may be associated with the host computer in various ways (e.g., built into the host computer, a wireless adapter that is connectable to the host computer, etc.)

A user mode driver installed on the host computer may control the WNIC of the host computer to operate with more control and/or lower latency than available through normal wireless driver stacks. For example, when the user mode driver is executed by one or more processors of the host computer in user mode of the host computer, the user mode driver may configure the WNIC to: (i) broadcast data packets without waiting for acknowledgement (e.g., ACK messages) from a display device (e.g., a HMD), and (ii) refrain from retransmitting the data packets unless retransmission is requested by the display device (e.g., HMD). Configuring the WNIC to operate in this "low-latency" manner deviates from the conventional 802.11 approach that uses a guaranteed packet delivery mechanism, and it stems from the notion that low-latency is preferable to reliable data transfer, at least in VR gaming systems and other real-time content systems. That is, while a HMD may be configured to perform error correction to mitigate the adverse impacts of latency, a desired user experience can be provided by establishing a wireless link that is able to deliver packets with low latency (e.g., 5 milliseconds or less), notwithstanding some unreliability in the data transfer (e.g., some dropped packets). When the WNIC is configured by the user mode driver in this manner, the host computer is able to transmit data packets (e.g., 802.11 frames) without wasting time frequently retransmitting data packets or waiting for acknowledgement from the display device (e.g., the HMD), thereby providing a low-latency wireless link with ample bandwidth, even in the 5 Gigahertz (GHz) band.

An example process for streaming pixel data wirelessly to a display device from a host computer may include executing a user mode driver in user mode of a host computer to configure a wireless network interface controller (WNIC) of the host computer to: (i) broadcast data packets without waiting for acknowledgement from a display device; and (ii) refrain from retransmitting the data packets unless retransmission is requested by the display device. The process may further include rendering, by a graphics-rendering application executing on the host computer, a frame of a series of frames, compressing pixel data for the frame, and transmitting, via the WNIC to the display device, one or more data packets carrying the compressed pixel data for the frame. In some embodiments, the host computer may receive data from the display device, and the frame may be rendered by the graphics-rendering application based at least in part on the data.

An example process for displaying an image based on pixel data received wirelessly from a host computer may include transmitting, via a wireless network interface controller (WNIC) of a display device to a host computer executing a graphics-rendering application, data for use by the graphics-rendering application to render a frame of a series of frames. The process may further include receiving, via the WNIC and from the host computer, one or more received data packets carrying compressed pixel data for the frame, determining that at least one data packet carrying additional pixel data for the frame was not received from the host computer, reconstructing the additional pixel data using a Forward Error Correction (FEC) algorithm based at least in part on the pixel data received in the one or more received data packets, and presenting an image on the one or more display panels based at least in part on the reconstructed frame.

By minimizing the latency involved in wirelessly streaming pixel data from a host computer to a display device, the techniques and systems described herein can provide noticeable performance improvements, such as a data transfer rate of 200 Megabits per second (Mbps) or higher, and a latency of 5 milliseconds (ms) or less. Because the techniques and systems described herein prize low-latency over reliable data transfer, it is expected that packets will be dropped. Instead of implementing a conventional retry mechanism to guarantee packet delivery, however, the pixel data that is lost in dropped packets can be reconstructed at the display device using error correction techniques (e.g., FEC). This allows for implementing a "limited retry" approach that retransmits packets exclusively in response to a request from the display device, such as when the display device determines that it needs more data to display an image and/or reconstruct a frame. When additional data is needed, the display device can request all data which was lost so that even if some of the additional, retransmitted data is lost, there is a very high likelihood that sufficient data will be present for frame reconstruction.

Furthermore, a user mode driver that executes in user mode (as opposed to kernel mode) of the host computer provides the added benefit of avoiding interference from the operating system firewall and other kernel layers on the host computer. Reducing the latency of the wireless link in a HMD system also means that a pose prediction of the HMD—which is used by the application executing on the host computer to render a given frame—can be made closer in time to the actual display of the image (i.e., the illumination time) for the given frame. This makes the disclosed wireless HMD comparable to a conventional, physically-tethered HMD that can avail itself to the high data transfer rate of a conventional wired connection. A pose prediction that is made closer in time to the illumination time for the frame means there is less error in the pose prediction, as compared to a pose prediction that is made farther in advance of the illumination time, which, in turn, means that graphics processing operations performed on the HMD can be minimized, making for a "lighter-weight" wireless HMD that is able to function more like a "thin-client" with a reduced rendering workload, as compared to a standalone HMD, for example, which cannot avail itself to the high-computing capacity of a communicatively-coupled host computer.

Also disclosed herein are techniques and systems for "scrambling" radio frequency (RF) paths by transmitting a series of data packets using different subsets of antennas of the WNIC. An example process for implementing this scrambling technique at the host computer may include executing a graphics-rendering application to render a frame of a series of frames, transmitting, to a display device (e.g., a HMD) using a first subset of multiple antennas of the WNIC, a first data packet carrying first pixel data for the frame, and transmitting, to the display device (e.g., a HMD) using a second subset of the multiple antennas, a second data packet carrying second pixel data for the frame. This process may iterate for one or more additional data packets and one or more additional subsets of antennas, and it can increase the likelihood of successful packet delivery when issues are encountered in delivering packets over a particular antenna configuration, for example. Because only a subset of data is required for reconstruction, it is not critical that all packets or TX configurations succeed, but it is much more important that some packets can succeed. This process may also iterate for one or more additional data packets and one or more additional subsets of antennas.

Also disclosed herein are techniques and systems for setting a modulation and coding scheme (MCS) rate based on the amount of data (e.g., pixel data) that is to be transmitted. An example process implemented on the host computer may include executing a graphics-rendering application to render a frame of a series of frames, determining an amount of pixel data for the frame to be carried in one or more payloads of one or more data packets, setting a MCS rate based at least in part on the amount of the pixel data, and transmitting, via the WNIC of the host computer to a display device (e.g., a HMD), the one or more data packets in accordance with the MCS rate. For the backchannel, an example process implemented on a display device (e.g., a HMD) may include determining an amount of data (e.g., head tracking data, control input data, etc.) to be carried in one or more payloads of one or more data packets, setting a MCS rate based at least in part on the amount of the data, and transmitting, via the WNIC of the display device (e.g., the HMD) to a host computer, the one or more data packets in accordance with the MCS rate. Setting the MCS rate based on the data payload may allow for minimizing the MCS rate in instances where a high MCS rate is not otherwise needed (e.g., when the quality of the wireless link is adequate, devices are in close range and within a line-of-site, etc.).

Other latency-reduction and/or performance improvement techniques are described in more detail below. Also disclosed herein are devices, systems, and non-transitory computer-readable media storing computer-executable instructions to implement the techniques and processes disclosed herein. Although the techniques and systems disclosed herein are discussed, by way of example, in the context of video game applications, and specifically VR gaming applications, it is to be appreciated that the techniques and systems described herein may provide benefits with other applications, including, without limitation, non-VR applications (e.g., AR applications), and/or non-gaming applications, such as industrial machine applications, defense applications, robotics applications, and the like.

FIG. 1 is a diagram illustrating an example low-latency wireless display system 100 including a head-mounted display (HMD) and a host computer, in accordance with embodiments disclosed herein. FIG. 1 depicts a head-mounted display (HMD) 102 worn by a user 104, as well as a host computer(s) 106. FIG. 1 depicts example implementations of a host computer 106 in the form of a laptop 106(1) carried in a backpack, for example, or a personal computer (PC) 106(N), which may be situated in the user's 104 household, for example. It is to be appreciated, however, that these exemplary types of host computers 106 are non-limiting to the present disclosure. For example, the host computer 106 can be implemented as any type and/or any number of computing devices, including, without limitation, a PC, a laptop computer, a desktop computer, a portable digital assistant (PDA), a mobile phone, tablet computer, a set-top box, a game console, a server computer, a wearable computer (e.g., a smart watch, etc.), or any other electronic device that can transmit data to, and receive data from, other devices. The host computer 106 may be collocated in the same environment as the HMD 102, such as a household of the user 104 wearing the HMD 102. Alternatively, the host computer 106 may be remotely located with respect to the HMD 102, such as a host computer 106 in the form of a server computer that is located in a remote geographical location with respect to the geographical location of the HMD 102. In a remote host computer 106 implementation, the host computer 106 may be communicatively coupled to the HMD 102 via a wide-area network, such as the Internet. In a local host computer 106 implementation, the host computer 106 may be collocated in an environment (e.g., a household) with the HMD 102, whereby the host computer 106 and the HMD 102 may be communicatively coupled together either directly or over a local area network (LAN) via intermediary network devices.

It is also to be appreciated that the exemplary HMD 102 is but one example type of wireless display device that can be implemented with the techniques and systems described herein. For example, other types and/or numbers of display devices can be utilized in lieu of, or in conjunction with, the HMD 102 described in many of the examples herein. Accordingly, the HMD 102 may be referred to herein more generally as a "wireless display device" or, simply as a "display device," and it is to be appreciated that other suitable types of display devices may exchange data with the host computer 106. Such display devices may include, without limitation, a television, a portable game device with a display, a laptop computer, a desktop computer, a PDA, a mobile phone, a tablet computer, a wearable computer (e.g., a smart watch, etc.), or any other electronic device that can transmit/receive data as well as display imagery on a display screen or panel.

In the example of FIG. 1, the HMD 102 and the host computer 106 are communicatively coupled together and are configured to work together in a collaborative fashion to render a given frame and present a corresponding image(s) on a display panel(s) 108 of the HMD 102. This collaboration iterates over a series of frames to render a series of images on the HMD 102 (e.g., a VR game). In the illustrated implementation, the HMD 102 includes one or more processors 110 and memory 112 (e.g., computer-readable media 112). In some implementations, the processors(s) 110 may include a central processing unit (CPU)(s), a graphics processing unit (GPU)(s) 114, both CPU(s) and GPU(s) 114, a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), etc. Additionally, each of the processor(s) 110 may possess its own local memory, which also may store program modules, program data, and/or one or more operating systems. In some embodiments, each of the processor(s) 110 may possess its own compression and/or decompression hardware.

The memory 112 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM or other optical storage, magnetic cassettes, magnetic tape, magnetic disk storage or other magnetic storage devices, RAID storage systems, or any other medium which can be used to store the desired information and which can be accessed by a computing device. The memory 112 may be implemented as computer-readable storage media ("CRSM"), which may be any available physical media accessible by the processor(s) 110 to execute instructions stored on the memory 112. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 110.

In general, the HMD 102 may include logic (e.g., software, hardware, and/or firmware, etc.) that is configured to implement the techniques, functionality, and/or operations described herein. The computer-readable media 112 can include various modules, such as instruction, datastores, and so forth, which may be configured to execute on the processor(s) 110 for carrying out the techniques, functionality, and/or operations described herein. Example functional modules in the form of a reconstruction module 116 and a compositor 118 are shown as being stored in the computer-readable media 112 and executable on the processor(s) 110, although the same functionality may alternatively be implemented in hardware, firmware, or as a system on a chip (SOC), and/or other logic. Furthermore, additional or different functional modules may be stored in the computer-readable media 112 and executable on the processor(s) 110. The reconstruction module 116 is configured to reconstruct frames using error correction, such as a forward error correction (FEC) algorithm. For example, if the HMD 102 does not receive all of the data to render an image corresponding to a given frame, the reconstruction module 116 is configured to perform error correction (e.g., using a FEC algorithm) using the data it received (e.g., using the two data packets received out of three data packets transmitted) in order to reconstruct the frame. Meanwhile, the compositor 118 is configured to modify pixel data and to output the modified pixel data to a frame buffer (e.g., a stereo frame buffer) so that a corresponding image(s) can be presented on the display panel(s) 108 of the HMD 102. For example, the compositor 118 may perform re-projection, which is a technique used to compensate for slight inaccuracies in an original pose prediction of the HMD 102 and/or to compensate for the application failing to make frame rate and/or to compensate for a late-arriving data packet(s). For example, a re-projected frame can be generated using pixel data from an application-rendered frame by transforming (e.g., through rotation and re-projection calculations) the application-rendered frame in a way that accounts for an updated prediction of the pose of the HMD 102, which may be more accurate than the original pose prediction. Accordingly, the modified pixel data obtained from applying the re-projection adjustments (and/or other adjustments) may be used to present an image(s) on the display panel(s) 108 of the HMD 102 for the given frame, and this process may iterate over the series of frames.

The HMD 102 may further include a head tracking system 120. The head tracking system 120 may leverage one or more sensors (e.g., infrared (IR) light sensors mounted on the HMD 102) and one or more tracking beacon(s) (e.g., IR light emitters collocated in the environment with the HMD 102) to track head motion or movement, including head rotation, of the user 104. This example head tracking system 120 is non-limiting, and other types of head tracking systems 120 (e.g., camera-based, inertial measurement unit (IMU)-based, etc.) can be utilized. The head tracking system 120 is configured to generate head tracking data 122, which can be sent, via a communications interface(s) 124 of the HMD 102 to the host computer 106 during runtime, as frames are being rendered, as depicted in FIG. 1.

The communications interface(s) 124 of the HMD 102 may include wired and/or wireless components (e.g., chips, ports, etc.) to facilitate wired and/or wireless data transmission/reception to/from the host computer 106, either directly or via one or more intermediate devices, such as a wireless access point (WAP). For example, the communications interface(s) 124 may include a wireless network interface controller (WNIC) 126. The WNIC 126 may conform to the Institute of Electrical and Electronics Engineers (IEEE) 802.11 standard(s) and may include a radio (e.g., having one or more antennas) to facilitate a wireless connection with the host computer 106 and/or other devices and for transmitting and receiving data packets using radio frequency (RF) communication. The WNIC 126 may be built into the HMD 102 or coupled to the HMD 102. The WNIC 126 may sometimes be referred to herein as a "wireless adapter" if the WNIC 126 is implemented as a peripheral or accessory device coupled to the HMD 102 in order to adapt the HMD 102 to operate as an 802.11-compliant wireless communication device. In some embodiments, the WNIC 126 may comprise a Universal Serial Bus (USB) wireless adapter (e.g., a USB dongle) that is plugged into a USB port on the HMD 102. In other embodiments, the WNIC 126 may be coupled to electrical components of the HMD 102 via a Peripheral Component Interconnect (PCI) interface. An example WNIC 126 that can be employed by the HMD 102 for wireless communication is the Realtek RTL8814 series chipset from Realtek Semiconductor Corp. of Hsinchu City, Taiwan. It is to be appreciated that the communications interface(s) 124 may further include one or more physical ports to facilitate a wired connection with the host computer 106 and/or another device(s) (e.g., a plug-in network device that communicates with other wireless networks).

Turning to the host computer 106, the host computer 106 is shown as including one or more processors 128 and memory 130 (e.g., computer-readable media 130). In some implementations, the processors(s) 128 may include a CPU (s), a GPU(s) 132, both CPU(s) and GPU(s) 132, a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include FPGAs, ASICs, ASSPs, SOCs, etc. Additionally, each of the processor(s) 128 may possess its own local memory, which also may store program modules, program data, and/or one or more operating systems. In some embodiments, each of the processor(s) 128 may possess its own compression and/or decompression hardware.

The memory 130 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM or other optical storage, magnetic cassettes, magnetic tape, magnetic disk storage or other magnetic storage devices, RAID storage systems, or any other medium which can be used to store the desired information and which can be accessed by a computing device. The memory 130 may be implemented as CRSM, which may be any available physical media accessible by the processor(s) 128 to execute instructions stored on the memory 130. In one basic implementation, CRSM may include RAM and Flash memory. In other implementations, CRSM may include, but is not limited to, ROM, EEPROM, or any other tangible medium which can be used to store the desired information and which can be accessed by the processor(s) 128.

In general, the host computer 106 may include logic (e.g., software, hardware, and/or firmware, etc.) that is configured to implement the techniques, functionality, and/or operations described herein. The computer-readable media 130 can include various modules, such as instructions, datastores, and so forth, which may be configured to execute on the processor(s) 128 for carrying out the techniques, functionality, and/or operations described herein. Example functional modules in the form of a video game client 134, a user mode driver 136, and an operating system(s) 138 are shown in FIG. 1. The operating system(s) 138 may be configured to manage hardware within, and coupled to, the host computer 106 for the benefit of other modules, and it may execute in kernel mode 140 (or kernel space 140) of the host computer 106. According to one embodiment, the operating system(s) 138 comprises the Linux operating system. According to another embodiment, the operating system(s) 138 comprise the Windows® operating system from Microsoft Corporation of Redmond, Wash. According to further embodiments, the operating system(s) 138 comprise the Unix operating system or one of its variants. It should be appreciated that other operating systems can also be utilized.

The video game client 134 (e.g., gaming software to play video games) is configured to execute one or more applications 142, such as a video game 142(1). The video game client 134 and the application(s) 142 are executed in user mode 144 (or user space 144) of the host computer 106. The kernel mode 140 and the user mode 144 correspond to respective protection domains—also known as rings—that protect data and functionality of the host computer 106 from faults and malware. Typically, a user mode, such as the user mode 144, is associated with the outermost ring and the least level of privileges to access memory and functionality. This ring is often referred to as "ring 3" and includes many application processes. A kernel mode, such as the kernel mode 140, is associated with an inner ring (sometimes the innermost ring, although in modern computing devices there is sometimes an additional level of privilege, a "ring 1") and a higher level of privileges to access memory and functionality. This ring is often referred to as "ring 0" and typically includes operating system 138 processes. Notably, the user mode driver 136, as its name implies, is executable in the user mode 144 of the host computer 106. The user mode driver 136 is associated with a wireless network interface controller (WNIC) 146 of the host computer 106, and, when executed in the user mode 144, the user mode driver 136 configures the WNIC 146 to operate with more control and/or lower latency than available through normal wireless driver stacks, as described in more detail below.

In general, a communications interface(s) 148 of the host computer 106 may include wired and/or wireless components (e.g., chips, ports, etc.) to facilitate wired and/or wireless data transmission/reception to/from the HMD 102 (or any other type of display device), either directly or via one or more intermediate devices, such as a WAP. As noted above, the communications interface(s) 148 may include the aforementioned WNIC 146. The WNIC 146 may conform to the IEEE 802.11 standard(s) and may include a radio (e.g., having one or more antennas) to facilitate a wireless connection with the HMD 102 and/or other devices and for transmitting and receiving data packets using RF communication. The WNIC 146 may be built into or coupled to the host computer 106. The WNIC 146 may sometimes be referred to herein as a "wireless adapter" if the WNIC 146 is implemented as a peripheral or accessory that is coupled to the host computer 106 in order to adapt the host computer 106 to operate as an 802.11-compliant wireless communication device. As depicted in FIG. 1, the WNIC 146, in some embodiments, may comprise a USB wireless adapter (e.g., a USB dongle) that is plugged into a USB port on the host computer 106. In other embodiments, the WNIC 146 may be coupled to electrical components of the host computer 106 via a PCI interface. An example WNIC 146 that may be used by the host computer 106 for wireless communication is the Realtek RTL8814 series chipset from Realtek Semiconductor Corp. It is to be appreciated that the communications interface(s) 148 may further include one or more physical ports to facilitate a wired connection with the HMD 102 and/or another device(s) (e.g., a plug-in network device that communicates with other wireless networks).

In some embodiments, the HMD 102 may represent a VR headset for use in VR systems, such as for use with a VR gaming system, in which case the video game 142(1) may represent a VR video game 142(1). However, the HMD 102 may additionally, or alternatively, be implemented as an AR headset for use in AR applications, or a headset that is usable for VR and/or AR applications that are not game-related (e.g., industrial applications). In AR, a user 104 sees virtual objects overlaid on a real-world environment, whereas, in VR, the user 104 does not typically see a real-world environment, but is fully immersed in a virtual environment, as perceived via the display panel(s) 108 and the optics (e.g., lenses) of the HMD 102. It is to be appreciated that, in some VR systems, pass-through imagery of the real-world environment of the user 104 may be displayed in conjunction with virtual imagery to create an augmented VR environment in a VR system, whereby the VR environment is augmented with real-world imagery (e.g., overlaid on a virtual world). Examples described herein pertain primarily to a VR-based HMD 102, but it is to be appreciated that the HMD 102 is not limited to implementation in VR applications.

In general, the application(s) 142 executing on the host computer 106 can represent graphics-based application(s) 142 (e.g., a video game 142(1)). An application 142 is configured to generate pixel data for a series of frames, and the pixel data is ultimately used to present corresponding images on the display panel(s) 108 of the HMD 102. In a HMD system 100, a component of the host computer 106 may determine a predicted "illumination time" for the frame. This predicted "illumination time" for the frame represents a time at which light emitting elements of the display panel(s) 108 of the HMD 102 will illuminate for the frame. This prediction can account for, among other things, the estimated time it will take to transmit data over a wireless communication link between the host computer 106 and the HMD 102, as well as a predicted render time of the application 142 and/or a known scan-out time of the pixels from the frame buffer(s). In some embodiments, the prediction may be different for a wireless communication link than it is for a wired communication link. In some embodiments, an illumination time can be predicted as an amount of time in the future (e.g., about 20-40 milliseconds in the future), and the amount of time may vary depending on the connection type (e.g., wired connection verses wireless connection).

The host computer 106 may receive, from the HMD 102, the head tracking data 122 (e.g., first head tracking data 122) generated by the head tracking system 120 of the HMD 102. This head tracking data 122 may be generated and/or sent at any suitable frequency, such as a frequency corresponding to the target frame rate and/or the refresh rate of the HMD 102, or a different (e.g., faster) frequency, such as 1000 hertz (Hz) (or 1 sensor reading every 1 millisecond). A component of the host computer 106 may determine a predicted pose that the HMD 102 will be in at the predicted illumination time based at least in part on the head tracking data 122. Pose data indicative of the predicted pose may be provided to the executing application 142 for rendering the frame (e.g., generating pixel data for the frame) based on the predicted pose, and the application 142 may output pixel data 150 associated with the frame. This pixel data 150 may correspond to an array of pixels of the display panel(s) 108 of the HMD 102. For example, the pixel data 150 that is output by the application 142 based on the pose data may include a two-dimensional array of per-pixel values (e.g., color values) for the array of pixels on the display panel(s) 108 of the HMD 102. In an illustrative example, a stereo pair of display panels 108 may include an array of 2160×1200 pixels on both display panels 108 of the HMD 102 (e.g., 1080×1200 pixels per display panel). In this illustrative example, the pixel data 150 may include 2160×1200 pixel values (or 2,592,000 pixel values). In some embodiments, the pixel data 150 may include data for each pixel that is represented by a single set of color and alpha values (e.g., one color value for a red channel, one color value for a green channel, one color value for a blue channel, and one or more values for one or more alpha channels).

It is to be appreciated that logic of the host computer 106 may also generate extra data besides (or, in addition to) the pixel data 150, and at least some of this extra data may be sent to the HMD 102 to aid the HMD 102. For example, extra data may be used to reconstruct a frame and/or to modify pixel data (e.g., re-projection). In some embodiments, the extra data can be packaged with the pixel data 150 and sent to the HMD 102, and at least some of the extra data can be used by logic of the HMD 102 for purposes of presenting an image(s) corresponding to the frame on the display panel(s) 108 of the HMD 102. The extra data can include, without limitation, the pose data indicative of the predicted pose of the HMD 102, depth data, motion vector data, parallax occlusion data, and/or extra pixel data. For example, in addition to generating the pixel data 150 corresponding to the to-be-rendered image, the application 142 may also generate depth data (e.g., Z-buffer data) for the frame and/or extra pixel data (sometimes referred to herein as "out-of-bounds pixel data" or "additional pixel data"). Additionally, or alternatively, motion vector data based at least in part on the head tracking data 122 received from the HMD 102 may be generated and transmitted to the HMD 102 for aiding in the processing of the pixel data 150 on the HMD 102. For example, motion vector data can be generated based on a comparison of head tracking data 122 generated at two different points in time (e.g., a comparison of head tracking data separated by a few milliseconds). Logic of the HMD 102 can utilize some or all of the extra data for purposes of modifying the pixel data 150 to correct for errors in the pose prediction made ahead of time at the host computer 106. For example, adjustments made by the HMD 102 may include, without limitation, adjustments for geometric distortion, chromatic aberration, re-projection, and the like.

As shown in FIG. 1, the pixel data 150 (and possibly extra data) is transmitted to the HMD 102 during runtime. The data transmission may occur directly (i.e., without the data being received by an intermediary device), or the data transmission may occur indirectly (i.e., by routing the data through an intermediary device, such as a wireless router or access point). In order to transmit data at relatively low-latency, the user mode driver 136 installed on the host computer 106 may be executed by the processor(s) 128 in the user mode 144 of the host computer 106, which configures (and thereby controls) the WNIC 146 to operate in a "low-latency" manner. For example, the user mode driver 136 may configure the WNIC 146 to at least: (i) broadcast data packets without waiting for acknowledgement (e.g., ACK messages) from a wireless display device, such as a HMD 102, and (ii) refrain from retransmitting data packets unless retransmission is requested by the display device (e.g., HMD 102). In some embodiments, the user mode driver 136 may exchange control information/signals with the WNIC 146 when the user mode driver 136 executes in the user mode 144 of the host computer 106, thereby controlling the WNIC 146 to receive and/or transmit data packets in a particular, low-latency manner. Configuring the WNIC 146 to operate in this manner deviates from the conventional 802.11 approach that utilizes a guaranteed packet delivery mechanism. It stems from the notion that low latency is preferable to reliable data transfer, at least in VR gaming systems. That is, while wireless display devices, such as HMDs, may be configured to perform error correction to mitigate the impacts of missing packets or late-arriving packets, a desired user experience can be provided by a wireless link that is able to deliver packets with low latency, notwithstanding some unreliability in the data transfer (e.g., some dropped packets). "Low latency," as used herein, may mean a latency of 5 milliseconds or less, where latency can be measured as a time period from a first time at which user action occurs (e.g., the user 104 may move a handheld controller in space) to a second time at which the user 104 perceives the action (e.g., the display panel(s) 108 emitting photons that correspond to a virtual hand moving in space). When the WNIC 146 is configured by the user mode driver 136 as described herein, the host computer 106 is able to transmit data packets (e.g., 802.11 frames) without wasting time needlessly retransmitting data packets (unless specifically requested to do so) or waiting for ACK messages from the display device (e.g., HMD 102), thereby providing a low-latency wireless link with ample bandwidth, even in the 5 Gigahertz (GHz) band.

In some embodiments, the user mode driver 136, when executing in user mode 144 of the host computer 106, is configured to place the WNIC 146 into a "quasi-Monitor Mode." For instance, 802.11-compliant wireless devices can typically operate in various modes, such as Master Mode, Managed Mode, Ad hoc Mode, Repeater Mode, Mesh Mode WiFi Direct Mode, Tunneled Direct Link Setup (TDLS) Mode, Monitor Mode, and the like. Monitor Mode allows a WNIC, such as the WNIC 146, to monitor traffic received on a given wireless channel. In the present disclosure, the user mode driver 136 may configure to the WNIC 146 to pretend to be a normal infrastructure network, operating as a host access point (AP), but, when the WNIC 146 transmits data packets on the given wireless channel, the networking stack (e.g., Windows® networking stack) may be bypassed, and retries may also be bypassed, which allows for accomplishing the same, or a similar, result as a system operating in Monitor Mode. A benefit is that the display device (e.g., HMD 102) can "believe" it is connecting to a regular network.

In some embodiments, the user mode driver 136 may configure the WNIC 146 to transmit data packets directly to a wireless display device (e.g., HMD 102), as opposed to indirectly through an intermediary device, such as a wireless access point (WAP) or a router. For example, the WNIC 146 may transmit data packets to the HMD 102 without transmitting the data packets through a WAP. In addition, the user mode driver 136 may configure the WNIC 146 to transmit data packets without waiting for acknowledgement (e.g., ACK messages) from the display device (e.g., HMD 102), and without retransmitting, unless and until the display device (e.g., HMD 102) specifically requests retransmission of a particular data packet(s) (i.e., referred to herein as "limited retry"—as specified in FIG. 1). In one example analogy, the user mode driver 136 may configure the WNIC 146 to operate like a walkie-talkie radio. For example, on the Transmit (Tx) side, the WNIC 146 may send a data packet in hopes that the data packet is delivered to its destination without using a retry mechanism or waiting for acknowledgement. On the Receive (Rx) side, the display device (e.g., the HMD 102) can simply use whatever data it happens to receive from the host computer 106, and if the display device (e.g., the HMD 102) does not receive everything that is transmitted from the host computer 106, mechanisms can be utilized by the display device (e.g., the HMD 102) to compensate for the packets that were not received. Accordingly, by minimizing the latency of the data transport layer, among other portions of the system, the techniques and systems described herein can provide noticeable performance improvements, such as a data transfer rate of 200 Mbps or higher, and/or a latency of 5 ms or less.

Furthermore, by executing the user mode driver 136 in the user mode 144 (as opposed to the kernel mode 140) of the host computer 106, interference from the operating system 138 firewall, among other things, can be avoided. Sometimes referred to herein as a "driver fast-path," this user mode driver 136 enables communication of data packets directly to the WNIC 146 to avoid lost time going through kernel layers, making the host computer 106 "driverless" in terms of avoiding use of a typical kernel mode 140 driver for controlling the WNIC 146. In other words, the user mode driver 136 may be compiled and run as code in the user mode 144 (or user space 144) of the host computer 106, which avoids involvement of an Internet Protocol (IP) layer stack or a kernel module in the process of wirelessly transmitting data packets from the host computer 106 to the display device (e.g., the HMD 102). For a Linux operating system 138, the techniques described herein may avoid using the network stack altogether for accessing the hardware. Instead, the hardware (e.g., the WNIC 146) may be directly accessed through the user mode driver 136 to provide efficiency gains. Because a user program (executing in user mode 144 of the host computer 106) performs compression (e.g., forward-error compression), as well as packaging of the frames that carry the pixel data 150, the technique may avoid some or all of the normal stacks that are typically used (e.g., media access control (MAC) 802.11, address resolution protocol (ARP), IP, Transmission Control Protocol (TCP), and user datagram protocol (UDP), etc.). By avoiding use of these stacks, the techniques described herein may minimize latencies caused by IP configuration, windows firewall, and the like, thereby providing a low-latency system 100

Furthermore, reducing the latency of the wireless link means that a pose prediction of the HMD 102 used by the application 142 to render a given frame can be made closer in time to the actual display of the image (i.e., the illumination time) for the given frame, making the disclosed wireless HMD 102 comparable to a conventional, physically-tethered HMD that can avail itself to the high data transfer rate of a conventional wired connection. A pose prediction that is made closer in time to the illumination time for the frame means there is less error in the pose prediction, as compared to a pose prediction that is made farther in advance of the illumination time, which, in turn, means that graphics processing operations performed on the HMD 102 can be minimized, making for a "lighter-weight" HMD 102 that is able to function more like a "thin-client" with a reduced rendering workload, as compared to a standalone HMD 102, for example.

The processes described herein are illustrated as a collection of blocks in a logical flow graph, which represent a sequence of operations that can be implemented in hardware, software, firmware, or a combination thereof (i.e., logic). In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 2A:
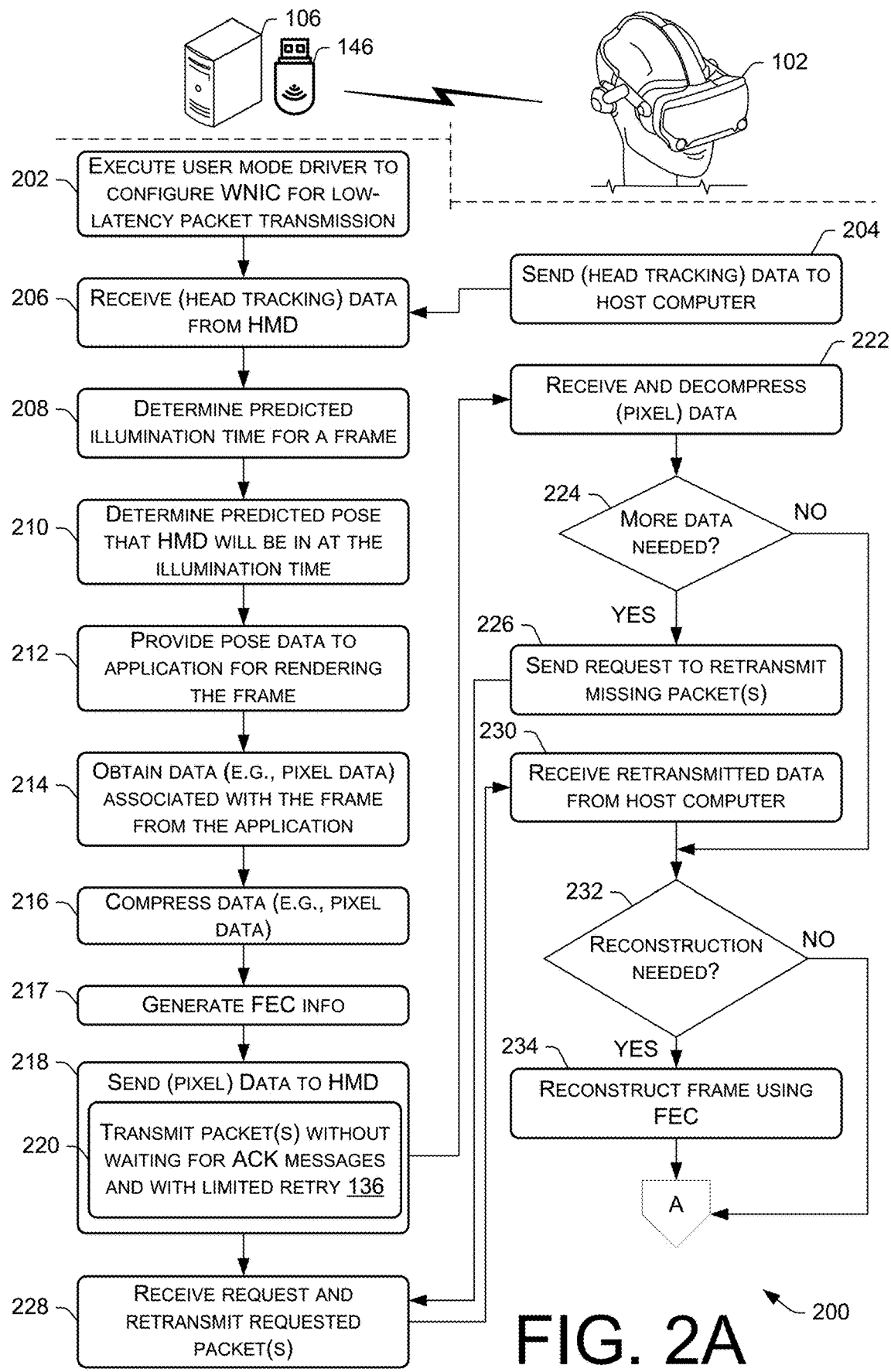

FIGS. 2A and 2B illustrates a flow diagram of an example process 200 for wirelessly streaming data from a host computer 106 to a HMD 102, in accordance with embodiments disclosed herein. For discussion purposes, the process 200 is described with reference to the previous figures.

At 202, logic of the host computer 106 may execute a user mode driver 136 in user mode 144 of the host computer 106 to configure a WNIC 146 of the host computer 106 for low-latency packet transmission. For example, the execution of the user mode driver 136 at block 202 may configure the WNIC 146 of the host computer 106 to broadcast data packets without waiting for acknowledgement from a display device, which, in this case, is the HMD 102. Furthermore, the execution of the user mode driver 136 at block 202 may configure the WNIC 146 of the host computer 106 to refrain from retransmitting the data packets unless retransmission is requested by the display device (e.g., the HMD 102). In some embodiments, as described in detail above with respect to FIG. 1, the user mode driver 136, when executed in the user mode 144, may configure the WNIC 146 to operate in a quasi-Monitor Mode. It is to be appreciated however, that the present disclosure is not limited to configuring the WNIC 146 to operate in a quasi-Monitor Mode, as other modes, like Infrastructure Mode can be used. In these other modes, the user mode driver 136 may nevertheless disable or at least limit retries (e.g., retransmission of data packets using conventional guaranteed packet delivery mechanisms), and/or may otherwise control channel packet management. This makes it possible to use the system in a quasi-Monitor Mode, or any other suitable 802.11-based mode(s), such as Infrastructure Mode, or even a hybrid mode where the WNIC 146 may be configured to operate partially in Infrastructure Mode and partially in Monitor Mode for determining how and/or when to send data packets.

At 204, a HMD 102 may send, to the host computer 106 that is communicatively coupled to the HMD 102, data that is to be used by the host computer 106 to render a frame. In the case of the HMD 102, the data sent at block 204 may comprise head tracking data 122 generated by a head tracking system 120 of the HMD 102. In the case of another type of display device, such as a portable game device with a display, the data sent at block 204 may comprise control input data (e.g., data corresponding to controls (e.g., buttons) pressed, touched, or otherwise manipulated on the game device). In the case of handheld controllers, positional controller data and/or auxiliary input data (e.g., touch sensing data, finger tracking data, etc.) may be sent to the host computer 106 at block 204. Positional data of one or more handheld controllers may be forward-predicted to the location that the controller(s) would be in when the frame is displayed to the user 104. For an implementation where the host computer 106 is wirelessly coupled to the HMD 102, the data (e.g., head tracking data 122) may be transmitted wirelessly from the HMD 102 to the host computer 106 at block 204. Although any suitable wireless communication protocol can be used, the present disclosure contemplates using an 802.11 protocol to transmit data between the HMD 102 and the host computer 106. The data may be transmitted at block 204 via the WNIC 126 of the HMD 102.

At 206, the host computer 106 may receive the data (e.g., the head tracking data 122) from the display device (e.g., the HMD 102). Although the data (e.g., the head tracking data 122) may be received in various ways depending on the implementation (e.g., wirelessly, over a wired connection, via a wide-area network, etc.), the data, in at least one embodiment, may be received wirelessly via the WNIC 146 of the host computer 106 at block 206. At this point in time when the host computer 106 receives the data (e.g., the head tracking data 122), the host computer 106 may be executing an application 142 thereon, such as a video game 142(1), that is tasked with rendering a frame of a series of frames for purposes of creating visual video game content to be displayed on the display device (e.g., the HMD 102). The following blocks 208-214 of the process 200 may represent sub-operations involved in rendering a frame of a series of frames, and this rendering may be performed, at least in part by a graphics-rendering application 142 (e.g., a video game 142(1)) executing on the host computer 106, and based at least in part on the data (e.g., the head tracking data 122) received at block 206.

At 208, logic of the host computer 106 may determine a predicted illumination time representing a time at which light emitting elements of the display panel(s) 108 of the display device (e.g., the HMD 102) will illuminate for the given frame. That is, the logic of the host computer 106 may determine a time when the photons associated with the imagery that is presented for the given frame will actually reach the user's 104 eye(s). This predicted illumination time is a time in the future (e.g., 20-40 ms in the future) because the render component 132 has to account for the time it takes for the application 142 to generate the pixel data 150, the time it takes the pixel data 150 to be transmitted from the host computer 106 to the HMD 102, and the time it takes for the pixel data 150 to be reconstructed and/or modified and scanned out on the HMD 102 before a corresponding image is ultimately presented on the display panel(s) 108 of the display device (e.g., the HMD 102).

At 210, the logic of the host computer 106 may determine, based at least in part on the data (e.g., head tracking data 122) received at block 206, a predicted pose that the HMD 102 will be in at the predicted illumination time that was determined at block 208. For example, the head tracking system 120 of the HMD 102 may be configured to track up to six degrees of freedom of the HMD 102 (e.g., 3D position, roll, pitch, and yaw), which can be sent as head tracking data 122 to the host computer 106 to determine a predicted pose of the HMD 102 (e.g., accounting for predicted head movement resulting in a future pose of the HMD 102).

At 212, the logic of the host computer 106 may provide, to the application 142 executing on the host computer 106 for purposes of rendering the given frame, pose data indicative of the predicted pose, which was determined at block 210. For instance, the application 142 may call a function to receive pose data, and, in response to the function call, the application 142 may be provided with the requested pose data (predicted to the target illumination time for the given frame, and predicted based at least in part on the head tracking data 122 received from the HMD 102) so that the application 142 can render the given frame according to the pose data, which corresponds to a virtual camera pose used to render the scene. In some embodiments, the application 142 may generate not only the pixel data 150 for the frame, but extra data, such as depth data and/or extra pixel data.

At 214, the logic of the host computer 106 may obtain (or receive), from the application 142, data (e.g., pixel data 150) associated with the given frame. The pixel data 150 may include pixel values, as described herein, for individual pixels in the array of pixels of the display panel(s) 108 of the display device (e.g., the HMD 102).

At 216, the logic of the host computer 106 may compress and/or serialize data that is to be sent to the display device (e.g., the HMD 102) for purposes of rendering imagery associated with the first frame. This data compressed may include the pixel data 150, and any extra data, that was generated at the host computer 106. "Compressing" the pixel data 150 at block 216 may sometimes be referred to herein as "encoding" the pixel data 150. Likewise, "decompressing" the pixel data may sometimes be referred to herein as "decoding" the pixel data. In some embodiments, compression and/or decompression may be performed at least partially in hardware (e.g., in silicon that is built into the respective GPUs and/or CPUs of the devices).

In some embodiments, the compression performed at block 216 involves changing a format of the pixel data. For example, the compression at block 216 may utilize a video compression standard, such as High Efficiency Video Coding (HEVC) and/or extensions of HEVC, which is sometimes referred to as H.265 and/or MPEG-H Part 2. HEVC is an example of a video compression standard that can be utilized at block 216, but it is to be appreciated that other suitable video compression standards can be utilized for compressing pixel data 150 at block 216, such as H.264 or VP9, for example. HEVC utilizes motion estimation for compressing pixel data 150, with the goal of sending less data than the uncompressed pixel data 150 in a system where bandwidth constraints are present, yet the compressed data is sufficient to approximate the original, uncompressed data on the receiving end (e.g., at the HMD 102).

In some embodiments, dynamic block compression may be used at block 216, whereby portions of the image are selectively compressed more or less depending on where the portions appear (e.g., portions in the center of vision may be compressed with relatively high quality, while portions toward the extremes or periphery of vision may be compressed with relatively low quality). This may minimize the overall bandwidth overhead. In some embodiments, fixed foveation techniques may be employed, such as by sending a parallel frame per eye, one low-resolution large, wide field of view (FOV) image, and another very high resolution, smaller FOV image for the center portion/area of the image where detail may matter more. Each image of the parallel frames may have different compression properties. For example, the first parallel frame may be compressed using a first compression algorithm, and a second parallel frame may be compressed using a second, different compression algorithm. In some embodiments, a foveation scheme is utilized where more data is generated for the center portion/area of the image and less data is generated for the periphery of the image.

At 217, the logic of the host computer 106 may generate FEC information using a FEC algorithm (i.e., FEC encoding). In some embodiments, FEC operates on the output from the compressed data (e.g., video) stream coming from block 216. Accordingly, the logic of the host computer 106 may, at block 217, encode compressed pixel data using a FEC algorithm. FEC is a technique used for controlling errors in data transmission by adding redundancy to the transmitted data using a predetermined algorithm. In some embodiments, ⅔ FEC may be utilized, meaning that the host computer 106 can encode the pixel data 150 using a FEC algorithm and transmit three data packets for every two data packets of pixel data 150 it would otherwise need to send for a given frame. In this scenario, the amount of data (e.g., pixel data 150) is inflated by 50%. If the HMD 102 receives any two of those three transmitted data packets, decompression and/or decoding logic of the HMD 102 can reconstruct the third (missing) data packet. However, if the HMD 102 does not receive two of those three transmitted packets, the HMD 102 may not be able to reconstruct the other two (missing) data packets with just a single received data packet, and may request retransmission as a result. The FEC algorithm may utilize any suitable type of code (e.g., block code, convolutional code, etc.) or technique. In some embodiments, a parity bit (or check bit) can be used as an error-correcting code. In some embodiments, double parity (or similar extensions and/or variations) can be utilized at block 217. In some embodiments, Reed-Solomon codes may be utilized at block 217. In other embodiments, other known error-correcting codes or techniques used in redundant array of independent disk (RAID) arrays may be utilized at block 217 in order to provide redundancy in the data signal, allowing full compressed data stream reconstruction (to reconstruct data streams in which one or more packets are dropped). In some embodiments, a compressed guard interval may be used to maximize data throughput with the potential of less than 400 nanoseconds (ns). In some embodiments, the compression quantity may be changed on a sub-frame basis as a form of dynamic compression alternation. In some embodiments, FEC may be used at block 217 in conjunction with retry packets requested at a FEC reconstruction layer in order to reconstruct video frames if insufficient packets are received to perform reconstruction without retry. This prevents retries from happening on data which would otherwise be able to be reconstructed.

At 218, the host computer 106 may transmit (or send), to the display device (e.g., the HMD 102), and via the WNIC 146, one or more data packets carrying at least the pixel data 150 for the given frame. As shown by sub-block 220, because of the manner in which the WNIC 146 was configured by the user mode driver 136, the data packet(s) may be transmitted without waiting for acknowledgement (ACK messages) from the display device (e.g., the HMD 102), and with limited retry (i.e., by refraining from retransmitting the data packet(s) unless retransmission is requested by the display device (e.g., the HMD 102). In some embodiments, standoff time may be reduced and/or the WNIC 146 may dynamically wait for carrier sense to go low when transmitting in a given wireless channel. In some embodiments, if the WNIC 146 detects, via a power signal, that another device(s) is/are transmitting on the desired channel, a time that the WNIC 146 waits to transmit after the power falls below a threshold can be reduced while remaining compliant with the 802.11 (e.g., 802.11ac) standard. Other mechanisms may be employed to reduce the overall standoff time to maximize channel re-use. In some embodiments, the transmission at block 218 may utilize approximately 150 Mbps and/or a relatively wide channel (e.g., 80-160 Megahertz (MHz). In some embodiments, a maximum Tx/Rx rate may be capped at 200 Mbps.

At 222, the display device (e.g., the HMD 102) may receive, from the host computer 106, the data packet(s) carrying the pixel data 150 associated with the given frame (and possibly the extra data mentioned herein). The data may be received via the WNIC 126 of the display device (e.g., the HMD 102), and the data may be deserialized and at least partially decompressed at block 222. In some embodiments, decompression may be performed at least partially in hardware.

At 224, logic of the display device (e.g., the HMD 102) may determine whether more data is needed to reconstruct the frame (and/or a missing data packet) and/or to display imagery for the frame. In some embodiments, this may involve determining whether a number of the data packet(s) received at block 222 is less than a threshold number (e.g., a threshold of two data packets). If it is determined, at block 224, that more data is needed (e.g., if a number of the data packet(s) received at block 222 is less than the threshold number (e.g., less than a threshold of two data packets), the process 200 may follow the YES route from block 224 to block 226.

At 226, the display device (e.g., the HMD 102) may transmit (or send), via the WNIC 126 to the host computer 106, a request to retransmit a missing data packet(s) that was/were not received. For example, the request may include an identifier(s) of a missing data packet(s) that the display device (e.g., the HMD 102) expected to, but did not, receive, which informs the host computer 106 as to which data packet(s) to retransmit.

At 228, the host computer 106 may receive, from the display device (e.g., the HMD 102), a request to retransmit a particular data packet(s) of the data packet(s) that the host computer previously transmitted at block 220. In response to receiving the request, the host computer 106 may, at block 228, retransmit, via the WNIC 146 to the display device (e.g., the HMD 102), the particular packet identified in the retransmission request. This retry approach is an example of a "limited retry" mechanism whereby the host computer 106 does not retransmit every packet for which an acknowledgement is not received. In fact, the user mode driver 136 configures the WNIC 146 to refrain from waiting for acknowledgement from the display device (e.g., the HMD 102). Instead, the present disclosure contemplates a technique where the host computer 106 waits to receive a request to retransmit a specific data packet(s), and retransmits that requested data packet exclusively in response to receiving the request. When additional data is needed, the display device (e.g., the HMD 102) can request all data which was lost (e.g., not received at the display device) so that even if some of the additional data retransmitted at block 228 is lost, there is a very high likelihood that sufficient data will be present (e.g., received at block 230) for frame reconstruction.

At 230, the display device (e.g., the HMD 102) may receive, via the WNIC 126 from the host computer 106, a retransmitted data packet(s) corresponding to the missing data packet(s), the retransmitted data packet(s) carrying at least some of the pixel data 150 for the given frame. It is recognized that, if the wireless link is 95% successful, that means 5% of the packets that are transmitted are dropped. If using FEC ⅔, 0.7% of the data may be retransmitted. Of those packets, 0.25% may be retransmitted. After the third round of retransmission (e.g., traversing blocks 226-230), there is under a 1 in 10 million chance the packet will not be able to be reconstructed. After some threshold number of retries, the system 100 may reset the stream or the wireless link. In any case, the process 200 may then proceed from block 230 to block 232, where logic of the display device (e.g., the HMD 102) may determine whether reconstruction is needed. Alternatively, if, at block 224, a determination is made that more data is not needed (e.g., if the number of data packet(s) received at block 222 is equal to or greater than the threshold number, such as equal to or greater than two data packets), the process 200 may follow the NO route from block 224 to block 232.

At 232, if it is determined that reconstruction is needed, then the process 200 may follow the YES route from block 232 to block 234. For example, the display device (e.g., the HMD 102) may determine that reconstruction is needed if it did not receive all of the data packets transmitted by the host computer 106 for the given frame (e.g., if one or more data packets were dropped). In some embodiments, this may involve determining that at least one data packet for the frame was not received at block 222.

At 234, logic (e.g., the reconstruction module 116) of the display device (e.g., the HMD 102) may reconstruct the frame (and/or a missing data packet(s)) using, for example, a FEC algorithm based at least in part on the data packet(s) received at block 222 (and possibly further based on the retransmitted data packet(s) received at block 230). For example, if the display device (e.g., the HMD 102) received enough data (e.g., two out of three data packets), the reconstruction module 116 may use a FEC algorithm, as described herein, to reconstruct the frame (and/or the missing data packet(s)). The process 200 may proceed from block 234 to block 236 of FIG. 2B via the off-page reference "A". Alternatively, if, at block 232, the logic of the display device (e.g., the HMD 102) determines that reconstruction is not needed, the process 200 may follow the NO route from block 232 to the off-page reference "A" leading to block 236 in FIG. 2B. For example, the logic of the display device (e.g., the HMD 102) may determine that reconstruction is not needed if it received all of the data packets transmitted (and/or retransmitted) by the host computer 106 for the given frame (e.g., no dropped packets). Although the process 200 shows that FEC is used for reconstruction after all data is "in hand" at the display device (e.g., the HMD 102), the present disclosure is not so limited to this temporal aspect of when FEC is used at the display device (e.g., the HMD 102). For example, FEC decoding can be performed on data as the data is received by the display device (e.g., the HMD 102). Furthermore, in some embodiments, a frame may be split (or divided) into multiple reconstructive groups to allow the streaming of chunks from the encoder (of the host computer 106) before the encoder has completed frame encoding. This gives the decoder (of the display device (e.g., HMD 102)) a head start.

Turning to FIG. 2B, via the off-page reference "A", at 236, logic of the HMD 102 may determine, based at least in part on updated head tracking data 122 generated by the head tracking system 120 of the HMD 102, an updated pose that the HMD 102 will be in at the illumination time for the given frame, which represents a time at which the light emitting elements of the display panel(s) 108 of the HMD 102 will illuminate for the given frame. Because the determination at block 236 is closer in time to the illumination time for the given frame, the pose prediction at block 236 is more accurate (e.g., has less error) than the pose prediction that was determined at block 210 of FIG. 2A, which was further ahead the illumination time. In some embodiments, the determination of the updated pose of the HMD 102 at block 236 may be based at least in part on motion vector data received from the host computer 106, or generated locally on the HMD 102. For example, the motion vector data generated from head tracking data 122 may be indicative of predicted head movement of the user 104, and the HMD 102 may use the motion vector data to, among other things, make the updated pose prediction of the HMD 102 with improved accuracy.

At 238, the logic (e.g., an embedded GPU 114) of the display device (e.g., the HMD 102) may modify the pixel data 150 received from the host computer 106 to obtain modified pixel data. As shown by sub-block 240, this modification of the pixel data 150 may include applying re-projection adjustments to the pixel data 150 to obtain modified pixel data associated with the given frame. The re-projection adjustments applied at sub-block 240 may be based at least in part on extra data received from the host computer 106. For example, pose data received from the host computer 106 may allow of the display device (e.g., the HMD 102) to compare the original predicted pose determined at block 210 to the updated pose determined at block 236, which may reveal a delta (or difference) between the compared poses, and the re-projection adjustments may include rotational calculations to compensate for this delta (e.g., by shifting and/or rotating the pixel data 150 one way or another, depending on the delta between the two pose determinations). In some embodiments, depth data, such as from a depth buffer (or Z-buffer), may be indicative of occluded objects in the scene, and may be used in applying the re-projection adjustments at sub-block 240. In some embodiments, the image for a frame may be split or partitioned into one or more segments, and the operations at block 238 may hallucinate/time-warp corrupted portions of the image with missing data. In some embodiments, raw, rather than panel-space, frames may be received, while projection, chromatic aberration correction and last-minute reprojection and/or time-warp may be performed within the HMD 102. This may allow dropped frames to have a minimum of impact as well as reducing perceived latency.

Furthermore, at 238, logic of the HMD 102 may also modify the pixel data 150 for the frame based at least in part on an array of motion vectors. For example, the host computer 106 may generate an array of motion vectors in the process of compressing the pixel data 150. In general, a "motion vector" is a two-dimensional (2D) arrow having an X and Y component for direction, and a magnitude (typically represented by a length of the 2D arrow). The magnitude of a motion vector may be specified in any suitable unit of measurement, such as a number of pixels in both X and Y component directions. In some examples, a video encoder (e.g., a video encode chip) of a GPU of the host computer 106 may generate the array of motion vectors based on the first pixel data obtained from the application at block 214 and based on pixel data of one or more other frames (e.g., previously-rendered frames). In order to generate the array of motion vectors, the video encoder of the host computer 106 may compare per pixel values (e.g., luminance values) between the pixel data of each frame that it is tasked with analyzing, per the compression algorithm. Additionally, or alternatively, the video encoder may compare macroblocks (e.g., a block of 16 pixels (i.e., 4×4 pixel macroblock), a block of 64 pixels (i.e., 8×8 pixel macroblock), a block of 4096 pixels (i.e., a 64×64 pixel macroblock, etc.) between the pixel data of each frame that it is tasked with analyzing, per the compression algorithm. The GPU of the host computer 106 may, as part of the compression operation(s), compare portions of the pixel data between a pair of frames at any suitable resolution.

In many video compression algorithms, including HEVC, there can be different types of frames, such as I-frames, P-frames, and B-frames. I-frames can stand on their own in the sense that they contain sufficient data to reconstruct the frame during decompression. Because of this, I-frames include a relatively large amount of data and are the least compressible, as compared to P-frames and B-frames. P-frames use data from previous frames (e.g., a reference frame) to compress and then decompress, and reconstruct, the original pixel data. P-frames are relatively smaller compared to I-frames because a P-frame encodes the differences from an earlier frame, such as in the form of motion vectors. The "B" in B-frame stands for bi-directional, which means that B-frames use both preceding and future frames to compress and then decompress, and reconstruct, the original pixel data. Because I-frames are relatively large, the instances of transmitting I-frames may be reduced or minimized in the present disclosure. In some scenarios, however, it may be beneficial to transmit an I-frame, such as if a wireless connection is temporarily lost between the host computer 106 and the display device (e.g., HMD 102) and is subsequently reestablished. In any case, a common series of frames may start with an I-frame followed by a series of P-frames. The compression of the P-frames at block 216 may involve encoding the differences from a reference frame (e.g., the I-frame, and/or a preceding P-frame, etc.) in terms of where blocks of the image have moved in the new frame relative to their locations in the reference frame. These differences may be represented by motion vectors that are send from the host computer 106 to the display device (e.g., HMD 102) at block 218. Accordingly, the display device (e.g., HMD 102) may extract and cache these motion vectors in memory of the display device, and the motion vectors may be used to modify the pixel data at block 238. Accordingly, other adjustments performed at block 238 may include, without limitation, geometric distortion adjustments, chromatic aberration adjustments, and the like. At least some of these adjustments may compensate for the distortion of the near-to-eye optical subsystem (e.g., lenses and other optics) of the HMD 102.

At 242, the logic (e.g., the compositor 118) of the display device (e.g., the HMD 102) may output the modified pixel data to a frame buffer(s) of the display device. For a display device (e.g., a HMD 102) with a pair of display panels 108, this modified pixel data may correspond to a frame that represents a pair of images to be displayed on the pair of display panels 108, and may be output to a stereo frame buffer accordingly.

At 244, logic of the display device (e.g., the HMD 102) may cause an image(s) to be presented on the display panel(s) 108 of the display device (e.g., the HMD 102) based on the modified pixel data output to the frame buffer at block 242. This may involve scanning out the modified pixel data to the display panel(s) 108 of the display device (e.g., the HMD 102) and illuminating the light emitting elements of the display panel(s) 108 to illuminate the pixels on the display panel(s) 108.

Thus, the process 200 is an example technique for implementing a low-latency wireless system 100 for displaying imagery on a display device (e.g., the HMD 102) while the frames for the displayed imagery are rendered on a host computer 106 executing a graphics-rendering application 142. This low-latency system 100 employs a WNIC 146 of the host computer 106 that is configured by a user mode driver 136 to operate in a low-latency manner, as described herein, where retries are limited, and acknowledgements from the display device (e.g., the HMD 102) are not required. The display device (e.g., the HMD 102) utilizes FEC to reconstruct missing pixel data, as needed. In addition, re-projection can be employed to ensure high-fidelity imagery is presented over a series of frames at any suitable frame rate. The WNIC 146 of the host computer 106 may utilize any suitable frequency band. Examples of suitable frequency bands include, without limitation, the 5 GHz band and the 60 GHz band, but any suitable frequency band can be utilized. Lower frequencies tend to penetrate solid objects better than higher frequencies, but higher frequencies may provide more bandwidth to transmit more data, and that area of the spectrum is not used as much. These and other factors may be considered in the decision to utilize one frequency band over another.

FIG. 3 illustrates a HMD 102 having a greater number, M, of antennas 300(1)-(M) than a number, N, of spatial streams 302(1)-(N) utilized by a WNIC 146 associated with a host computer 106, in accordance with embodiments disclosed herein. In some embodiments, the system 100 introduced in FIG. 1, may represent a multiple-input multiple-output (MIMO) wireless communication system comprising a host computer 106 and a display device (e.g., a HMD 102). The host computer 106 (via the WNIC 146) and the display device (via the WNIC 126) are configured to operate according to the 802.11 standard(s), such as the 802.11ac standard. This is merely an example and other wireless communication protocols or standards may be utilized. Although both WNICs 126 and 146 may include one or more antennas, FIG. 3 illustrates the antennas 300 of the WNIC 126 associated with the display device (e.g., the HMD 102), which, in this case, includes multiple antennas 300(1)-(M), where "M" is any number greater than or equal to two. The WNIC 146 of the host computer 106 may be configured to transmit (e.g., simultaneously) via its antennas, multiple signal streams, also called "spatial streams" 302, to the display device (e.g., the HMD 102). This may be similar in the reverse direction (e.g., where the HMD 102 transmits multiple signal/spatial streams to the host computer 106), such as when the HMD 102 transmits head tracking data 122 to the host computer 106.

FIG. 3 illustrates a system configuration that leverages diversity to mitigate issues with multi-path or fading. Specifically, in order to adequately service the entire play area robustly, and to guard against insufficient data received at the HMD 102, the display device (e.g., the HMD 102) may be configured with a first number, M, of antennas 300 that is greater than a second number, N, of spatial streams 302 the WNIC 146 of the host computer 106 is configured to utilize. In this manner, the second number, N, of spatial streams 302 can be fixed and the likelihood of successful packet delivery can be increased, at least in situations where the user 104 moves into an orientation where the wireless link quality is of low quality for at least one antenna 300. By using the extra (i.e., M>N) antenna(s) 300, wireless link quality can be improved in such orientations. In an illustrative example, if the WNIC 146 associated with the host computer 106 is configured to utilize three spatial streams 302 (i.e., N=3), the WNIC 126 associated with the HMD 102 may comprise at least four antennas 300 (i.e., M≥4). In some embodiments, space time block coding (STBC) may be used in conjunction with additional antennas 300 (e.g., more antennas 300 than spatial streams 302) for decoding frames transmitted with one or multiple spatial streams 302. In some embodiments, antennas 300 can be placed or positioned in distinct areas or locations on the display device (e.g., the HMD 102) to increase the likelihood of successful packet delivery. The techniques may utilize any combination of antennas 300 that can decode the signal. In some embodiments, multiple receivers with distinct blocks can be utilized to allow devices which missed the start-of-frame preamble or were already engaged with another 5 GHz transmission to receive the packet. In general, multiple spatial streams 302 can be used to improve bandwidth.

Figure 4:
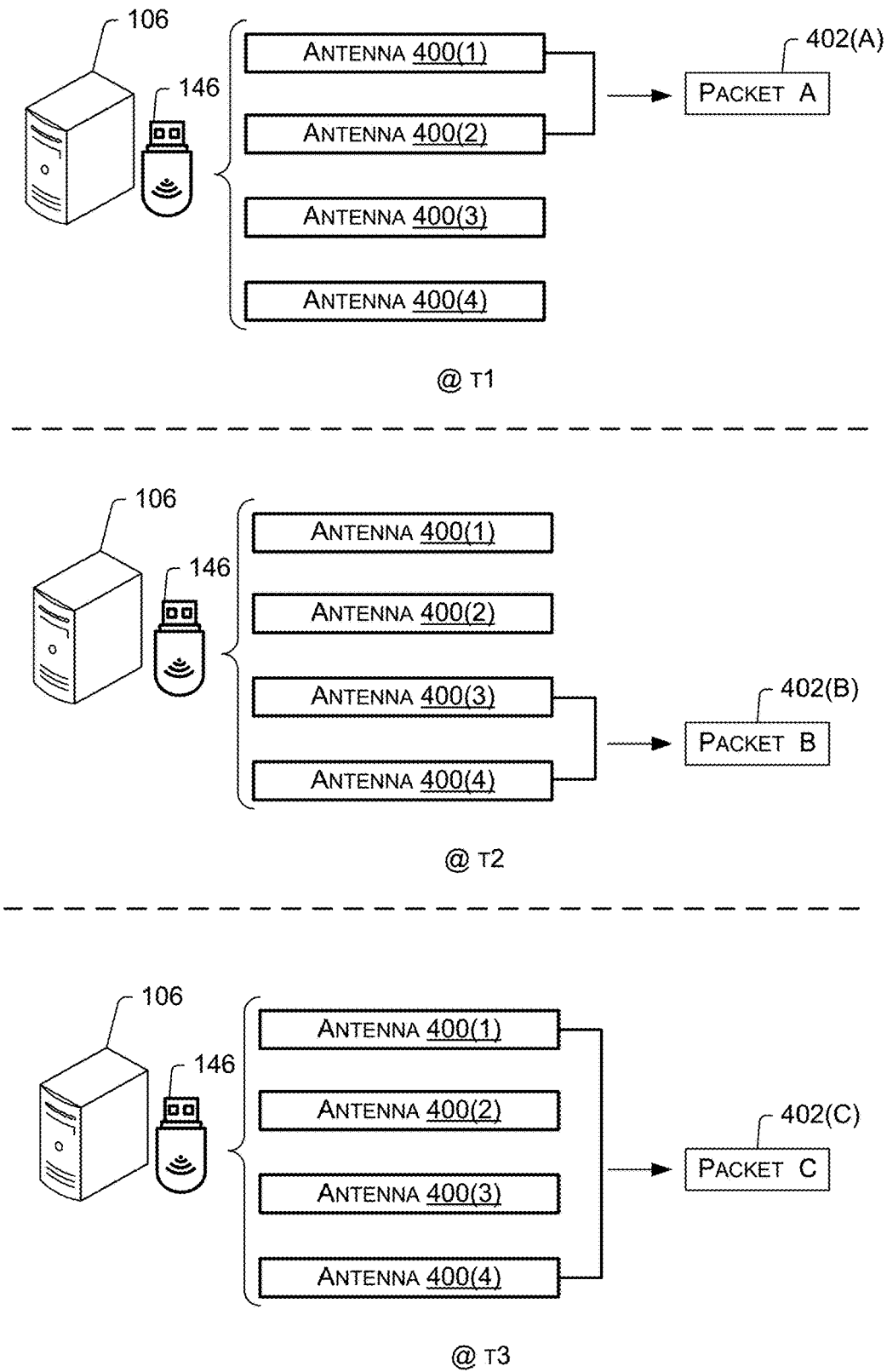
FIG. 4 illustrates a technique for transmitting a series of data packets using different subsets of antennas, in accordance with embodiments disclosed herein.

FIG. 4 illustrates a technique for transmitting a series of data packets using different subsets of antennas, in accordance with embodiments disclosed herein. Sometimes referred to herein as "scrambling," the technique illustrated in FIG. 4 changes the transmission RF paths on a per-transmission-unit basis, at least in implementations where multiple transmit (Tx) antennas are available. This way, if a specific transmission RF path is impassible due to fading, multi-path, or inseparability, the other transmission RF paths are likely to get through, and will enable reconstruction of the video stream.

In the example of FIG. 4, the WNIC 146 associated with the host computer 106 comprises four antennas 400(1), 400(2), 400(3), and 400(4). It is to be appreciated that "four" is an exemplary implementation, and that the WNIC 146 may comprise fewer than four antennas 400 or more than four antennas 400. In the example of FIG. 4, when sending two spatial streams 302, you can transmit the two spatial streams six ways from the four antennas 400(1)-(4) using a different antenna configuration to transmit each data packet 402 of a series of data packets 402. In this example, if one antenna configuration results in one or more dropped packets, the approach illustrated in FIG. 4 mitigates the adverse effects of that one antenna configuration if the other antenna configurations do not result in dropped packets. This is because the HMD 102 is configured to reconstruct a frame (and/or dropped packets) using a FEC algorithm, as described herein. In an example using ⅔ FEC—meaning, if any two out of three data packets are received by the HMD 102, the logic of the HMD 102 can reconstruct the frame using the two received data packets—at time, t1, packet A 402(A), which is carrying first pixel data for a given frame, can be transmitted using a first subset of the multiple antennas 400 (e.g., antennas 400(1) and 400(2)). Assume, in an example scenario, that the display device (e.g., the HMD 102) receives packet A 402(A) via the WNIC 126 associated with the display device (e.g., the HMD 102). At time, t2, packet B 402(B), which is carrying second pixel data for the given frame, can be transmitted using a second subset of the multiple antennas 400 (e.g., antennas 400(3) and 400(4)). Assume, in the running example, that due to multipath fading and a non-separable stream, packet B 402(B) is not received by the display device (e.g., the HMD 102). At time, t3, packet C 402(C), which is carrying third pixel data for the given frame, can be transmitted using a third subset of the multiple antennas (e.g., antennas 400(1) and 400(4)). Assume, in the running example, that the display device (e.g., the HMD 102) receives packet C 402(C). Thus, after the third packet (e.g., packet C 402(C)) is transmitted, the display device (e.g., the HMD 102) can reconstruct packet B 402(B) using FEC (e.g., ⅔ FEC). This reconstruction at the display device (e.g., the HMD 102) is made possible by the use of different antenna configurations to transmit the three data packets 402(A), 402(B), and 402(C). In some embodiments, the "scrambling" approach illustrated in FIG. 4 can be utilized at block 218 of the process 200 to transmit data packets to the display device (e.g., the HMD 102). In other embodiments, the "scrambling" approach illustrated in FIG. 4 can be utilized independently of the process 200. For example, the host computer 106 may be configured to execute a graphics-rendering application 142 to render a frame of a series of frames, and may transmit, to a display device (e.g., the HMD 102) a series of data packets 402 carrying pixel data for the frame using the "scrambling" approach of FIG. 4, and using any suitable wireless communications protocol.

In 802.11-compliant networks, a modulation and coding scheme (MCS) is used to specify the transmission rate. In order for nodes on the network to communicate with one another, a negotiation takes place between them to determine the optimum supported MCS rate of the receiver. For example, the transmitter may send a MCS request to the receiver, the receiver may measure the characteristics of the wireless link between the transmitter and the receiver (to assess the quality of the wireless link), and the receiver may send a MCS response, which includes the recommended MCS to be used by the transmitter. Thus, the MCS rate in conventional wireless networks is set based on the quality of the wireless link, and this MCS rate is continuously adjusted as the channel conditions change.

Figure 5:
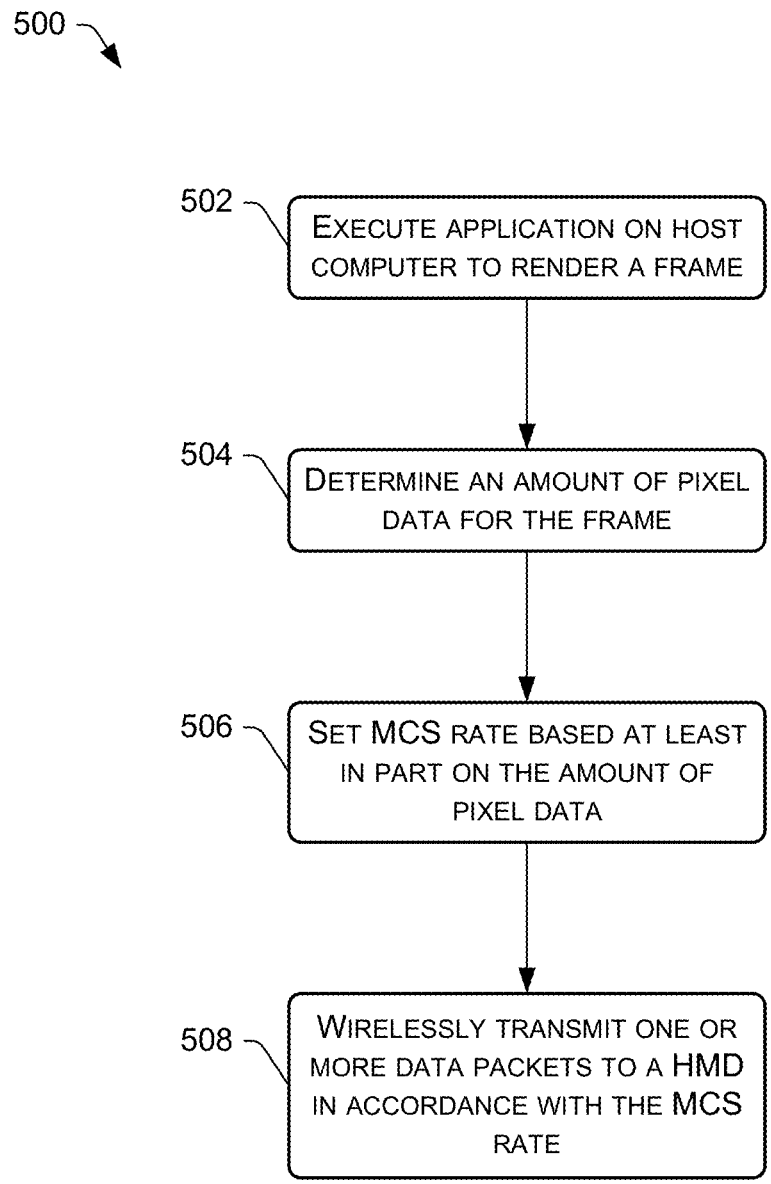
FIG. 5 illustrates a flow diagram of an example process for setting a modulation and coding scheme (MCS) rate based at least in part on the amount of data (e.g., pixel data for a frame) that is to be carried in one or more payloads of one or more data packets, in accordance with embodiments disclosed herein.

FIG. 5 illustrates a flow diagram of an example process 500 for setting a modulation and coding scheme (MCS) rate based at least in part on the amount of data (e.g., pixel data 150 for a frame) that is to be carried in one or more payloads of one or more data packets, in accordance with embodiments disclosed herein. For discussion purposes, the process 500 is described with reference to the previous figures.

At 502, logic of a host computer 106 may execute a graphics-rendering application 142 (e.g., a video game 142(1)) to render a frame of a series of frames. In the example of a HMD 102 system (e.g., the system 100 depicted in FIG. 1), this may involve predicting a pose of the HMD 102 based at least in part on head tracking data 122, providing pose data indicative of the predicted pose to the application 142 as input, and receiving pixel data 150 as output from the application 142.

At 504, logic of the host computer 106 may determine an amount of pixel data 150 for the frame to be carried in one or more payloads of one or more data packets. For example, if the application 142 renders a frame for a complex scene with many different textures and colors, the amount of pixel data 150 for that frame may be relatively large (e.g., measured in terms of bits or bytes of data). By comparison, the amount of pixel data 150 in a frame for a scene of low complexity (e.g., a scene of the sky with no clouds) might be relatively small. Accordingly, the amount of pixel data 150 generated frame-to-frame may vary depending on scene complexity or other factors, and the amount of pixel data 150 for a given frame may be determined at block 504 after the application 142 renders a given frame.

At 506, logic of the host computer 106 may set (or select) a MCS rate based at least in part on the amount of the pixel data 150 determined at block 504. This may or may not involve a negotiation with the receiver, which, in this case, is a display device (e.g., the HMD 102). In at least one embodiment, the setting of the MCS rate at block 506 does not involve a negotiation between the host computer 106 and the display device (e.g., the HMD 102). In other words, the MCS rate may be set independently by the host computer 106, based at least in part on the amount of pixel data determined at block 504.

At 508, the host computer 106 may transmit, via the WNIC 146 to a display device (e.g., the HMD 102), the one or more data packets in accordance with the MCS rate set at block 506. Setting the MCS rate based on how much data (the data payload) is to be transmitted, as in the process 500, allows for reducing the MCS rate when a high MCS rate is not otherwise needed. For example, in many setups, the HMD 102 is very close to the host computer 106 (e.g., within 25-30 feet) and is within a line-of-site of the host computer 106. As a result, a robust signal and/or a high MCS rate may not be needed in many setups.

In some embodiments, the MCS rate may be set (or selected) at block 506 based on additional factors (i.e., in addition to the amount of pixel data 150 determined at block 504). For example, the quality of the wireless link may be factored into the decision of setting the MCS rate, in combination with the amount of pixel data 150 to be transmitted. Accordingly, a negotiation may take place at block 506 to set the MCS rate. For instance, the host computer 106 may transmit a MCS request to the display device (e.g., the HMD 102), the display device (e.g., the HMD 102) may measure the characteristics of the wireless link between the host computer 106 and the display device (e.g., the HMD 102), and the display device (e.g., the HMD 102) may send a MCS response to the host computer 106, the MCS response including a recommended MCS rate. Furthermore, to share channel space with other neighboring devices, a "low airtime mode" may be utilized, which may allow many devices to share the same space (e.g., the same wireless channel), at the cost of potential link quality issues. The techniques and systems described herein may share wireless channels by using very high MCS rates. For instance, two or even three devices could share a common channel by using MCS rates high enough to allow there to still be a fair amount of free channel time. In some embodiments, the user 104 may specify (or select) a stream quality preset among multiple stream quality presets, such as low-, medium-, and high-quality presets, and the system may set the MCS rate based on the specified (or selected) stream quality preset.

In addition to setting the MCS rate at block 506, the process 500 may involve selecting the wireless channel and bandwidth on a per-packet basis to send packets with a custom MCS rate on the selected wireless channel and bandwidth. Any packets received by the host computer 106 that are addressed to the selected MAC or broadcast may directed to the user mode 144 application.

Meanwhile, for the backchannel (i.e., transmitting data, such as head tracking data 122, from the HMD 102 to the host computer 106) a process similar to the process 500 can be used by the HMD 102 to set a lower MCS rate, as compared to the forward channel. This is because the data (e.g., head tracking data 122) is typically much less data than pixel data 150 transmitted from the host computer 106 to the HMD 102 (e.g., at most, 4 Mbps of back channel). Accordingly, the HMD 102 may implement a process that generates head tracking data 122, and then determines an amount of the head tracking data 122 to transmit (similar to block 504), sets the MCS rate based at least in part on the amount of head tracking data 122, and wirelessly transmits one or more data packets to the host computer 106 in accordance with the MCS rate. A lower MCS rate will increase the likelihood of data (e.g., the head tracking data 122) being received by the host computer 106 via the backchannel.

Figure 6:
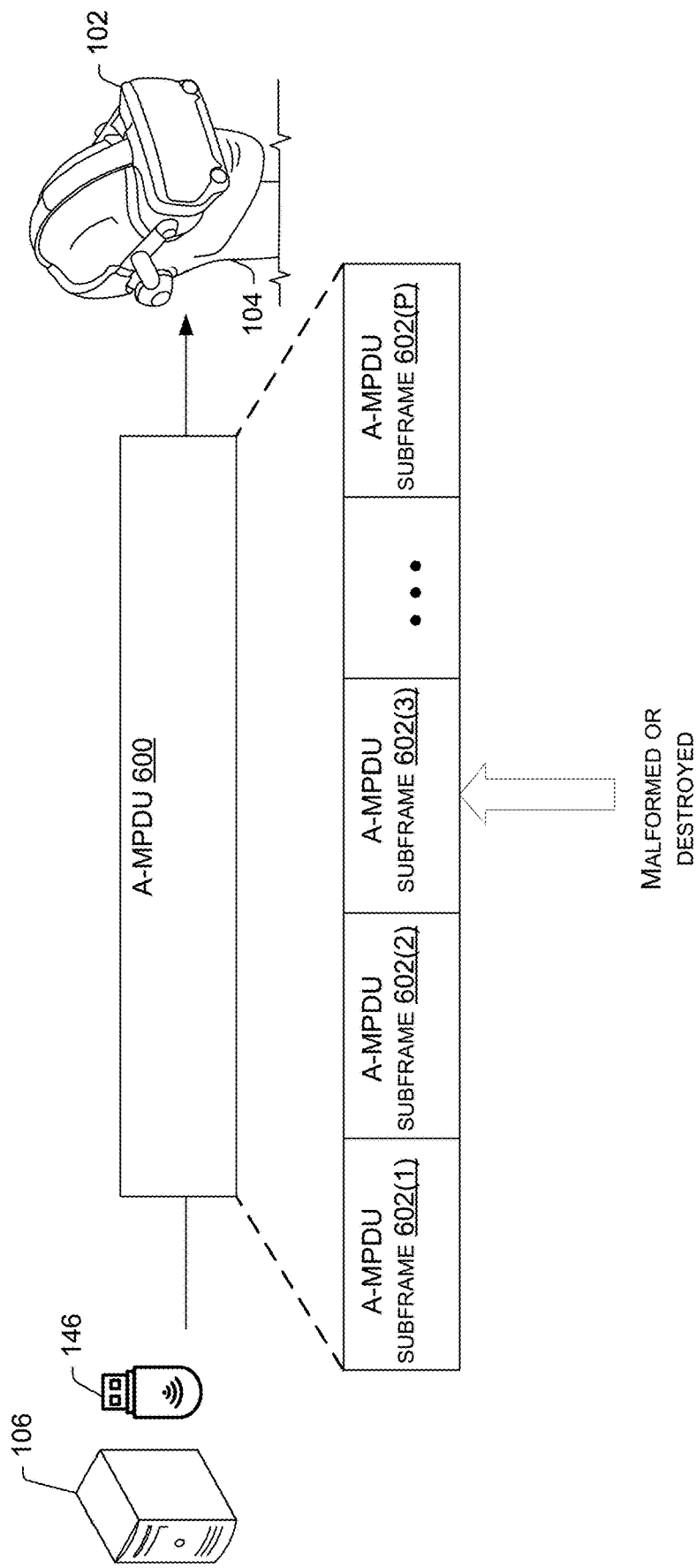
FIG. 6 illustrates an example Aggregated MAC Protocol Data Unit (A-MPDU) packet transmitted from a host computer to a HMD, the A-MPDU packet including a subframe(s) that is/are missing or unusable by a HMD, in accordance with embodiments disclosed herein.

FIG. 6 illustrates an example Aggregated MAC Protocol Data Unit (A-MPDU) packet 600 transmitted from a host computer 106 to a HMD 102. The A-MPDU packet 600 includes at least one subframe 602 that is missing or is unusable by a HMD 102, in accordance with embodiments disclosed herein. For example, the A-MPDU packet 600 may comprise multiple subframes 602(1)-(P), and at least one of the subframes 602 (e.g., subframe 602(3)) may be malformed or destroyed, as illustrated in FIG. 6.

A-MPDU packets may be used to transmit more data in a single data packet, which, in conventional wireless systems, may increase the throughput. However, because conventional wireless systems impose a requirement to send all of the data in a particular sequence, if any subframe of the A-MPDU packet has been mangled or destroyed, conventional wireless systems treat such an A-MPDU packet as a loss, and the entire A-MPDU packet may be retransmitted, which takes additional time. In the technique shown in FIG. 6, the host computer 106 is configured to send the A-MPDU packet 600 to the HMD 102 notwithstanding the mangled or destroyed subframe 602(3). In this manner, even though the subframe 602(3) is missing or is unusable by the HMD 102, the remaining subframes 602 besides the missing/unusable subframe 602(3) can be used for reconstructing the frame (and/or the missing/unusable subframe 602(3)), such as by using a FEC algorithm, as described herein. With the technique shown in FIG. 6, there is no need to retransmit an A-MPDU packet 600 if there are sufficient subframes 602 in the A-MPDU packet from which pixel data can be reconstructed. Accordingly, the host computer 106, in some embodiments, may be configured to transmit pixel data 150 in an A-MPDU packet 600 with a subframe(s) 602 that is/are missing or unusable by the HMD 102. In other words, the host computer 106 may be configured to transmit, to the HMD 102, the subframes 602 of an A-MPDU packet 600 regardless of the integrity of the other subframes in the A-MPDU packet 600. Accordingly, the techniques and systems described herein may result in significant bandwidth improvements via frame aggregation (e.g., via USB or firmware contention), and the techniques may use Tx aggregation with fairly large (4 to 12 KB) frames. Throughput can be maximized by transmitting A-MPDU packets 600, with or without sending block ACKs. Furthermore, the amount of data in each frame can be reduced in order to appear more like an Tx aggregation stream and instead of transmitting a full 802.11 header, the techniques and systems described herein may transmit an 802.11 header with the minimum data needed to avoid interference with other devices transmitting on the same frequency band (e.g., 5 GHz) but still result in the acquisition of data. In some embodiments, management frames can be used to send data between the devices of the system 100.

Figure 7:
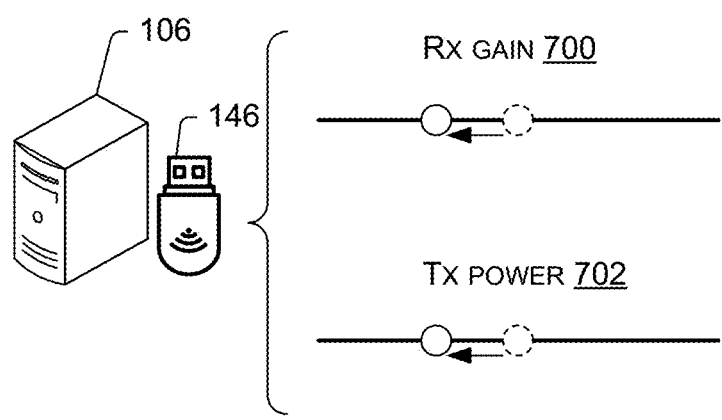
FIG. 7 illustrates a technique for reducing Receive (Rx) gain and/or Transmit (Tx) power, in accordance with embodiments disclosed herein.

FIG. 7 illustrates a technique for reducing Receive (Rx) gain 700 and/or Transmit (Tx) power 702, in accordance with embodiments disclosed herein. In some environments, such as office buildings, multi-tenant apartment buildings, and the like, wireless congestion can be high, which may lead to increased packet standoff because the devices will perceive the channel as in-use. Accordingly, the technique shown in FIG. 7 to balance the Rx gain 700 and the Tx power 702 of the WNIC 146 associated with the host computer 106 may simultaneously minimize the impact to nearby WiFi networks and the impact the nearby WiFi networks have on the system 100 of FIG. 1. For example, the host computer 106 may be configured to reduce the Rx gain 700 associated with the WNIC 146 to a reduced value less than a default Rx gain value, such as by operating the WNIC 146 at a Rx gain 700 of −9 decibels relative to isotropic (dBi) or less. Reducing the Rx gain 700 in this manner may prevent packets transmitted from "distant stations" (e.g., wireless transmitters other than the host computer 106) from colliding with packets transmitted via the WNIC 146 of the host computer 106. Reducing the Rx gain 700 may also avoid a standoff while a distant station is transmitting.

In addition, or alternatively, to reducing the Rx gain 700, the host computer may reduce the Tx power 702 associated with the WNIC 146 to a reduced value less than a default Tx power value, such as by operating the WNIC 146 at a Tx power 702 of 100 milliwatts (20 decibels per milliwatt (dBm)) or less. Reducing the Tx power 702 in this manner may reduce heat produced and power draw on the sending side as well as mitigate interference with distant stations/ other networks. By balancing the Tx power 702 and Rx gain 700, as depicted in FIG. 7, more density can be achieved on the wireless channel. This will provide an effective mechanism for maximizing the channel use and availability when operating both radios at close range. In many cases, the HMD 102 is very close and within line-of-site of the host computer 106, which means that a relatively high Rx gain 700 and Tx power 702 may not be needed. Balancing the Rx gain 700 and/or the Tx power 702 may be implemented at the host computer 106 may setting a register on the WNIC 146 to change the respective values.

In some instances, channel congestion may force the hardware (e.g., the WNIC 146 and the WNIC 126) to perform a Tx standoff using the carrier-sense circuitry, which may be acceptable if the channel is not monopolized. However, Tx standoff time that is too high may be undesirable. Other mechanisms may be employed to reduce the overall standoff time to maximize channel re-use. In addition, by reducing the carrier sense threshold and/or disabling it and finding another mechanism to adhere to regulatory demands, the techniques and systems described herein may minimize the impact of distant, weak, or extraneous interference in-band.

Figure 8C:
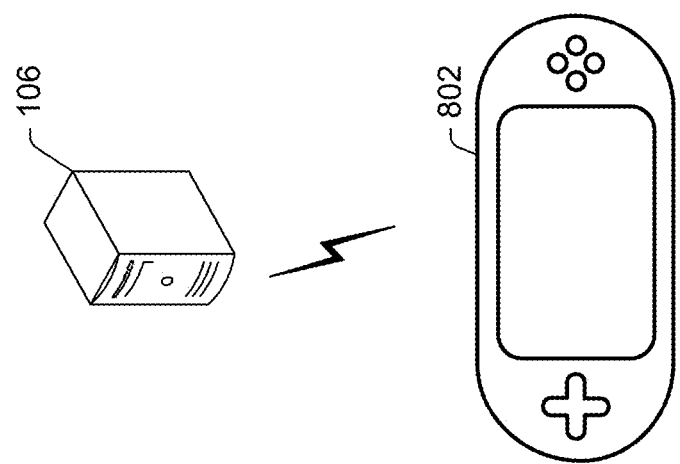
FIGS. 8A, 8B, and 8C illustrate alternative setups of a system for streaming data from a host computer to a wireless display device, in accordance with embodiments disclosed herein.
Figure 8B:
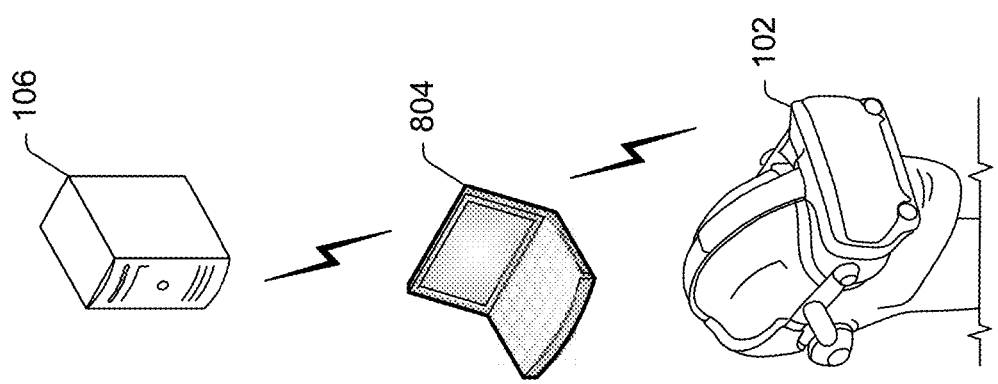
Figure 8A:
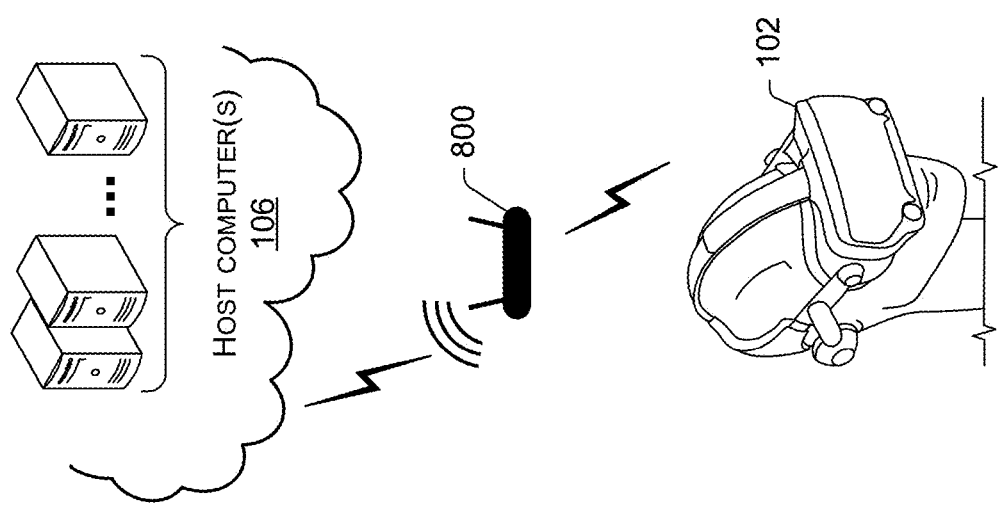

FIGS. 8A, 8B, and 8C illustrate alternative setups of a system for streaming data from a host computer 106 to a wireless display device, in accordance with embodiments disclosed herein. Briefly referring to FIG. 1, an example implementation is where the host computer 106 is collocated in an environment with the display device in the form of a HMD 102 worn by the user 104. For example, the host computer 106 may be located in the user's 104 house while the user 104 is using the HMD 102 in the house, regardless of whether the host computer 106 is located in the same room or a different room as the HMD 102. Alternatively, the host computer 106 in the form of a mobile computing device (e.g., a tablet or laptop) may be carried (e.g., in a backpack on the back of the user 104), thereby allowing for greater mobility. For example, the user 104 could be located in a public park while using such a system.

FIG. 8A shows an alternative implementation where the host computer 106 represents one or more server computers located at a geographically remote location with respect to the HMD 102. In this case, the HMD 102 may be communicatively coupled to the host computer(s) 106 via an access point (AP) 800, such as a wireless AP (WAP), a base station, etc. In an illustrative example, data is exchanged (e.g., streamed) between the host computer 106 and the HMD 102 via the AP 800, such as by streaming data over the Internet. In this implementation, the host computer 106 and/or the HMD 102 may implement one or more of the techniques described herein to improve performance (e.g., lower latency) when streaming data (e.g., pixel data 150) from the host computer 106 to the HMD 102, and when streaming head tracking data 122 from the HMD 102 to the host computer 106.

FIG. 8B shows yet another alternative implementation where the host computer 106 is communicatively coupled to the HMD 102 via an intermediate computing device 804, such as a laptop or a tablet computer. A difference between FIGS. 8A and 8B is that the AP 800 in FIG. 8A may act as a data routing device for a server computer 106 that is remotely located with respect to the HMD 102, while the intermediate computing device 804 of FIG. 8B may act as a data routing device for a host computer 106 that is collocated within the same environment as the HMD 102. The intermediate computing device 804 may even perform a portion of the rendering workload (e.g., reconstructing pixel data and/or modifying pixel data, as described herein) so that the HMD 102 can remain as "light-weight" as possible.

FIG. 8C shows yet another alternative implementation where the HMD 102 is replaced by another type of display device in the form of a portable game device 802 with a display. In the setup of FIG. 8C, the portable game device 802 may send control input data to the host computer 106 as the user 104 manipulates the controls of the portable game device 802 with his/her hands, and the host computer 106 may generate pixel data 150 based at least in part on the control input data, and may transmit the pixel data 150 to the portable game device 802, as described herein predominantly with respect to a HMD 102. Accordingly, traditional game-streaming systems that are challenged by the adverse environment on most home networks may benefit from the techniques and systems described herein to improve performance (e.g., lower the latency) of those systems. For example, a home personal computer running a gaming platform/application 142 with a WNIC 146 (e.g., a USB dongle) may allow for continuous playback of video streams and gameplay interactions at extremely low latencies without risk of multi-frame dropouts. Use of a gaming streaming service according to the techniques and systems described herein may enable a higher quality of gameplay experience, furthermore, while the techniques are predominantly described herein with reference to VR gaming, some or all of the techniques may apply equally to the 2D/3D gaming realm.

Figure 9:
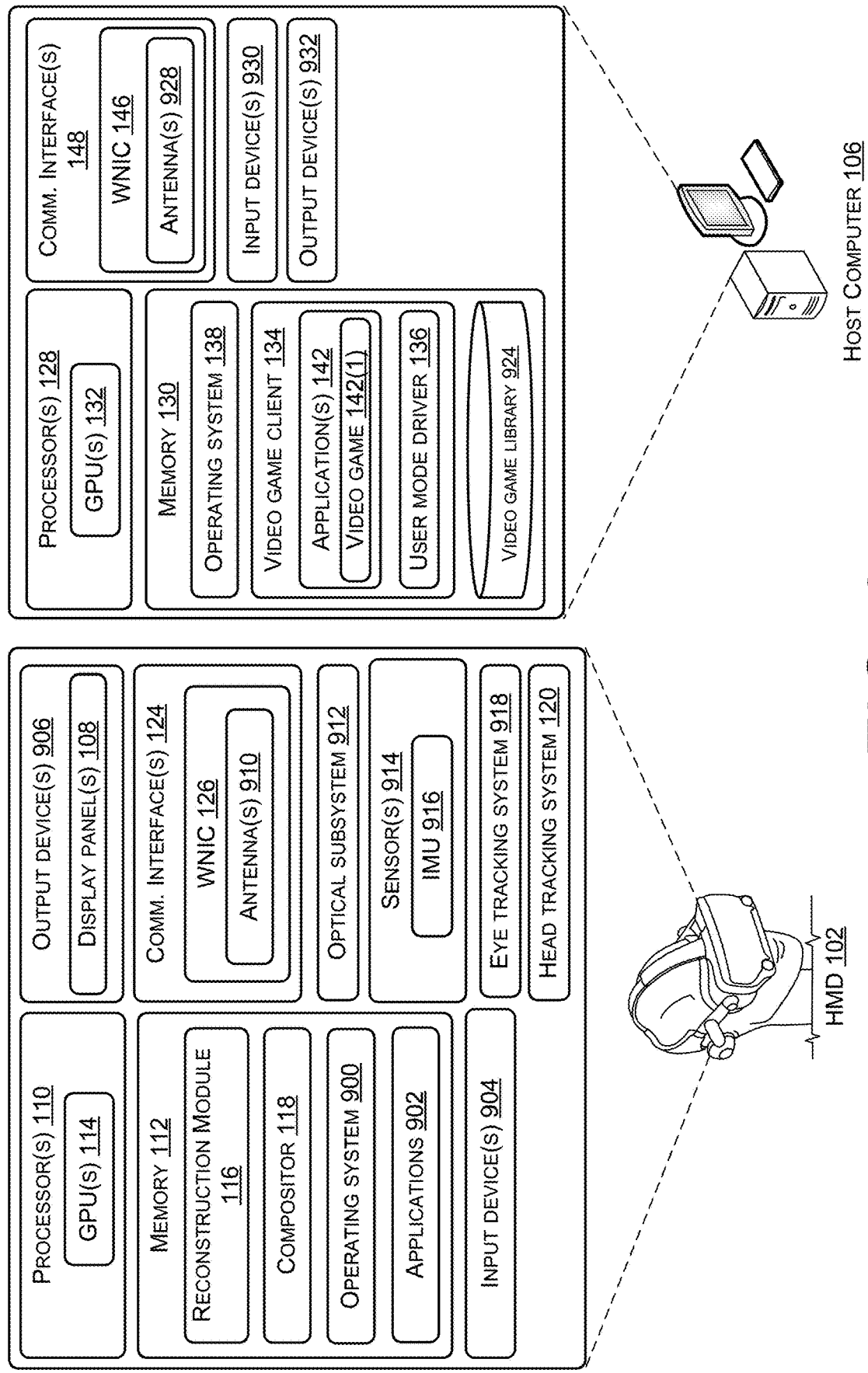
FIG. 9 illustrates example components of a wearable device, such as a HMD (e.g., a VR headset), and a host computer, in which the techniques disclosed herein can be implemented.

FIG. 9 illustrates example components of a wearable device, such as a HMD 102 (e.g., a VR headset), and a host computer 106, in which the techniques disclosed herein can be implemented, according to the embodiments disclosed herein. It is to be appreciated, however, that relevant components described with respect to the HMD 102 may be implemented in other types of display devices (e.g., the portable game device 802), except that irrelevant components may be omitted from those other types of display devices. The HMD 102 may be implemented as a connected device that is communicatively coupled to the host computer 106 during operation, and/or as a standalone device. In either mode of operations, the HMD 102 is to be worn by a user 104 (e.g., on a head of the user 104). In some embodiments, the HMD 102 may be head-mountable, such as by allowing a user 104 to secure the HMD 102 on his/her head using a securing mechanism (e.g., an adjustable band) that is sized to fit around a head of a user 104. In some embodiments, the HMD 102 comprises a virtual reality (VR) or augmented reality (AR) headset that includes a near-eye or near-to-eye display(s). As such, the terms "wearable device", "wearable electronic device", "VR headset", "AR headset", and "head-mounted display (HMD)" may be used interchangeably herein to refer to the device 102 of FIG. 9. However, it is to be appreciated that these types of devices are merely example of a HMD 102, and it is to be appreciated that the HMD 102 may be implemented in a variety of other form factors. It is also to be appreciated that some or all of the components shown in FIG. 9 may be implemented on the HMD 102. Accordingly, in some embodiments, a subset of the components shown as being implemented in the HMD 102 may be implemented on the host computer 106 or another computing device that is separate from the HMD 102.

In the illustrated implementation, the HMD 102 includes the aforementioned processor(s) 110, which may include one or more GPUs 114, as well as the memory 112 storing the reconstruction module 116 and the compositor 118 that are executable by the processor(s) 110, the display panel(s) 108, the head tracking system 120, and the communications interface(s) 124 including the WNIC 126.

The HMD 102 may include a single display panel 108 or multiple display panels 108, such as a left display panel and a right display panel of a stereo pair of display panels. The one or more display panels 108 of the HMD 102 may be used to present a series of image frames (herein referred to as "frames") that are viewable by the user 104 wearing the HMD 102. It is to be appreciated that the HMD 102 may include any number of display panels 108 (e.g., more than two display panels, a pair of display panels, or a single display panel). Hence, the terminology "display panel," as used in the singular herein, may refer to either display panel 108 of a pair of display panels of a two-panel HMD 102, or it may refer to a single display panel 108 of a HMD 102 with any number of display panels (e.g., a single-panel HMD 102 or a multi-panel HMD 102). In a two-panel HMD 102, a stereo frame buffer may render, for instance, 2160×1200 pixels on both display panels of the HMD 102 (e.g., 1080×1200 pixels per display panel).

The display panel(s) 108 of the HMD 102 may utilize any suitable type of display technology, such as an emissive display that utilizes light emitting elements (e.g., light emitting diodes (LEDs)) or laser illumination to emit light during presentation of frames on the display panel(s) 108. As an example, display panel(s) 108 of the HMD 102 may comprise liquid crystal displays (LCDs), organic light emitting diode (OLED) displays, inorganic light emitting diode (ILED) displays, or any other suitable type of display technology for HMD applications.

The display panel(s) 108 of the HMD 102 may operate at any suitable refresh rate, such as a 90 Hertz (Hz) refresh rate, which can be a fixed refresh rate or a variable refresh rate that dynamically varies over a range of refresh rates. The "refresh rate" of a display is the number of times per second the display redraws the screen. The number of frames displayed per second may be limited by the refresh rate of the display, if using a fixed refresh rate. Thus, a series of frames may be processed (e.g., rendered) and displayed as images on the display such that a single frame of the series of frames is displayed with every screen refresh. That is, in order to present a series of images on the display panel(s) 108, the display panel(s) 108 may transition from frame-to-frame, in the series of frames, at the refresh rate of the display, illuminating the pixels at every screen refresh.

The display system of the HMD 102 may implement any suitable type of display driving scheme, such as a global flashing type of display driving scheme, a rolling band type of display driving scheme, or any other suitable type of display driving scheme. In a global flashing type of display driving scheme, the array of light emitting elements of the display illuminate simultaneously at every screen refresh, thereby flashing globally at the refresh rate. In a rolling band type of display driving scheme, individual subsets of the light emitting elements of the display can be illuminated independently and sequentially in a rolling band of illumination during an illumination time period. These types of display driving schemes may be enabled by the light emitting elements being individually addressable. If the array of pixels and the array of light emitting elements on the display panel(s) 108 are arranged in rows and columns (but not necessarily with a one-pixel per one-light emitting element correspondence), individual rows and/or individual columns of light emitting elements may be addressed in sequence, and/or individual groups of contiguous rows and/or individual groups of contiguous columns of light emitting elements may be addressed in sequence for a rolling band type of display driving scheme.

In general, as used herein, "illuminating a pixel" means illuminating the light emitting element that corresponds to that pixel. For example, a LCD illuminates a light emitting element of a backlight to illuminate the corresponding pixel(s) of the display. Furthermore, as used herein, a "subset of pixels" may comprise an individual pixel or multiple pixels (e.g., a group of pixels). In order to drive the display panel(s) 108, the HMD 102 may include, among other things, a display controller(s), display driver circuitry, and similar electronics for driving the display panel(s) 108. Display driver circuitry may be coupled to the array of light emitting elements of the display panel(s) 108 via conductive paths, such as metal traces, on a flexible printed circuit. In an example, a display controller(s) may be communicatively coupled to the display driver circuitry and configured to provide signals, information, and/or data to the display driver circuitry. The signals, information, and/or data received by the display driver circuitry may cause the display driver circuitry to illuminate the light emitting elements in a particular way. That is, the display controller(s) may determine which light emitting element(s) is/are to be illuminated, when the element(s) is/are to illuminate, and the level of light output that is to be emitted by the light emitting element(s), and may communicate the appropriate signals, information, and/or data to the display driver circuitry in order to accomplish that objective.

The computer-readable media 112 may store additional functional modules that are executable on the processor(s) 110, although the same functionality may alternatively be implemented in hardware, firmware, or as a SOC, and/or other logic. For example, an operating system module 900 may be configured to manage hardware within and coupled to the HMD 102 for the benefit of other modules. In addition, in some instances the HMD 102 may include one or more applications 902 stored in the memory 112 or otherwise accessible to the HMD 102. For example, the application(s) 902 may include, without limitation, a video game application (e.g., a basic video game with graphics that are less-computationally-intensive to process), a video playback application (e.g., an application that accesses a video content library stored on the HMD 102 and/or in the cloud), etc. The HMD 102 may include any number or type of applications 902 and is not limited to the specific examples described herein.

Generally, the HMD 102 has input devices 904 and output devices 906. The input devices 904 may include control buttons. In some implementations, one or more microphones may function as input devices 904 to receive audio input, such as user voice input. In some implementations, one or more cameras or other types of sensors (e.g., inertial measurement unit (IMU)) may function as input devices 904 to receive gestural input, such as a hand and/or head motion of the user 104. In some embodiments, additional input devices 904 may be provided in the form of a keyboard, keypad, mouse, touch screen, joystick, and the like. In other embodiments, the HMD 102 may omit a keyboard, keypad, or other similar forms of mechanical input. Instead, the HMD 102 may be implemented relatively simplistic forms of input device 904, a network interface (wireless or wire-based), power, and processing/memory capabilities. For example, a limited set of one or more input components may be employed (e.g., a dedicated button to initiate a configuration, power on/off, etc.) so that the HMD 102 can thereafter be used. In one implementation, the input device(s) 904 may include control mechanisms, such as basic volume control button(s) for increasing/decreasing volume, as well as power and reset buttons.

The output devices 906 may include a display panel(s) 108, which may include one or multiple display panels 108 (e.g., a stereo pair of display panels 108), as described herein. The output devices 906 may further include, without limitation, a light element (e.g., LED), a vibrator to create haptic sensations, a speaker(s) (e.g., headphones), and/or the like. There may also be a simple light element (e.g., LED) to indicate a state such as, for example, when power is on.

The HMD 102 may further include the communications interface(s) 124 including, without limitation, the WNIC 126, which is shown as including one or more antennas 910 to facilitate a wireless connection to a network and/or to a second device, such as the host computer 106, as described herein. The WNIC 146 may implement one or more of various wireless technologies, such as Wi-Fi, Bluetooth, radio frequency (RF), and so on. It is to be appreciated that the HMD 102 may further include physical ports to facilitate a wired connection to a network and/or a second device, such as the host computer 106.

The HMD 102 may further include optical subsystem 912 that directs light from the display panel(s) 108 to a user's eye(s) using one or more optical elements. The optical subsystem 912 may include various types and combinations of different optical elements, including, without limitations, such as apertures, lenses (e.g., Fresnel lenses, convex lenses, concave lenses, etc.), filters, and so forth. In some embodiments, one or more optical elements in optical subsystem 912 may have one or more coatings, such as anti-reflective coatings. Magnification of the image light by optical subsystem 912 allows display panel(s) 108 to be physically smaller, weigh less, and consume less power than larger displays. Additionally, magnification of the image light may increase a field of view (FOV) of the displayed content (e.g., images). For example, the FOV of the displayed content is such that the displayed content is presented using almost all (e.g., 120-150 degrees diagonal), and in some cases all, of the user's FOV. AR applications may have a narrower FOV (e.g., about 40 degrees FOV). Optical subsystem 912 may be designed to correct one or more optical errors, such as, without limitation, barrel distortion, pincushion distortion, longitudinal chromatic aberration, transverse chromatic aberration, spherical aberration, comatic aberration, field curvature, astigmatism, and so forth. In some embodiments, content provided to display panel(s) 108 for display is pre-distorted (e.g., by the applied geometric distortion adjustments and/or chromatic aberration adjustments described herein), and optical subsystem 912 corrects the distortion when it receives image light from display panel(s) 108 generated based on the content.

The HMD 102 may further include one or more sensors 914, such as sensors used to generate motion, position, and orientation data. These sensors 914 may be or include gyroscopes, accelerometers, magnetometers, video cameras, color sensors, or other motion, position, and orientation sensors. The sensors 914 may also include sub-portions of sensors, such as a series of active or passive markers that may be viewed externally by a camera or color sensor in order to generate motion, position, and orientation data. For example, a VR headset may include, on its exterior, multiple markers, such as reflectors or lights (e.g., infrared or visible light) that, when viewed by an external camera or illuminated by a light (e.g., infrared or visible light), may provide one or more points of reference for interpretation by software in order to generate motion, position, and orientation data. The HMD 102 may include light sensors that are sensitive to light (e.g., infrared or visible light) that is projected or broadcast by base stations in the environment of the HMD 102.

In an example, the sensor(s) 914 may include an inertial measurement unit (IMU) 916. IMU 916 may be an electronic device that generates calibration data based on measurement signals received from accelerometers, gyroscopes, magnetometers, and/or other sensors suitable for detecting motion, correcting error associated with IMU 916, or some combination thereof. Based on the measurement signals such motion-based sensors, such as the IMU 916, may generate calibration data indicating an estimated position of HMD 102 relative to an initial position of HMD 102. For example, multiple accelerometers may measure translational motion (forward/back, up/down, left/right) and multiple gyroscopes may measure rotational motion (e.g., pitch, yaw, and roll). IMU 916 can, for example, rapidly sample the measurement signals and calculate the estimated position of HMD 102 from the sampled data. For example, IMU 916 may integrate measurement signals received from the accelerometers over time to estimate a velocity vector and integrates the velocity vector over time to determine an estimated position of a reference point on HMD 102. The reference point is a point that may be used to describe the position of the HMD 102. While the reference point may generally be defined as a point in space, in various embodiments, reference point is defined as a point within HMD 102 (e.g., a center of the IMU 916). Alternatively, IMU 916 provides the sampled measurement signals to an external console (or other computing device), which determines the calibration data. The sensors 914 may include sensors of one or more handheld controllers that are part of a HMD system. Accordingly, in some embodiments, the controllers may transmit sensor data to the host computer 106 and the host computer 106 may fuse the sensor data it receives from the HMD 102 and the handheld controller(s).

The sensors 914 may operate at relatively high frequencies in order to provide sensor data at a high rate. For example, sensor data may be generated at a rate of 1000 Hz (or 1 sensor reading every 1 millisecond). In this way, one thousand readings are taken per second. When sensors generate this much data at this rate (or at a greater rate), the data set used for predicting motion is quite large, even over relatively short time periods on the order of the tens of milliseconds.

As mentioned, in some embodiments, the sensors 914 may include light sensors that are sensitive to light emitted by base stations in the environment of the HMD 102 for purposes of tracking position and/or orientation, pose, etc., of the HMD 102 in 3D space. The calculation of position and/or orientation may be based on timing characteristics of light pulses and the presence or absence of light detected by the sensors 914.

The HMD 102 may further include an eye tracking system 918 that generates eye tracking data. The eye tracking system 918 may include, without limitation, a camera or other optical sensor inside HMD 102 to capture image data (or information) of a user's eyes, and the eye tracking system 918 may use the captured data/information to determine motion vectors, interpupillary distance, interocular distance, a three-dimensional (3D) position of each eye relative to HMD 102, including a magnitude of torsion and rotation (i.e., roll, pitch, and yaw) and gaze directions for each eye. In one example, infrared light is emitted within HMD 102 and reflected from each eye. The reflected light is received or detected by a camera of the eye tracking system 918 and analyzed to extract eye rotation from changes in the infrared light reflected by each eye. Many methods for tracking the eyes of a user 104 can be used by eye tracking system 918. Accordingly, eye tracking system 918 may track up to six degrees of freedom of each eye (i.e., 3D position, roll, pitch, and yaw) and at least a subset of the tracked quantities may be combined from two eyes of a user 104 to estimate a gaze point (i.e., a 3D location or position in the virtual scene where the user is looking), which may map to a location(s) on the display panel(s) 108 for predicting where the user 104 will be looking in terms of an individual subset (e.g., a row) or a group of contiguous subsets (e.g., a group of contiguous rows) of the pixels of the display panel(s) 108. For example, eye tracking system 918 may integrate information from past measurements, measurements identifying a position of a user's 104 head, and 3D information describing a scene presented by display panel(s) 108. Thus, information for the position and orientation of the user's 104 eyes is used to determine the gaze point in a virtual scene presented by HMD 102 where the user 104 is looking, and to map that gaze point to a location(s) on the display panel(s) 108 of the HMD 102.

The HMD 102 may further include the aforementioned head tracking system 120. The head tracking system 120 may leverage one or more of the sensor 914 to track head motion, including head rotation, of the user 104, as described above. For example, the head tracking system 120 can track up to six degrees of freedom of the HMD 102 (i.e., 3D position, roll, pitch, and yaw). These calculations can be made at every frame of a series of frames so that the application 142 can determine how to render a scene in the next frame in accordance with the head position and orientation. In some embodiments, the head tracking system 120 is configured to generate head tracking data 122 that is usable to predict a future pose (position and/or orientation) of the HMD 102 based on current and/or past data, and/or based on the known/implied scan out latency of the individual subsets of pixels in a display system. This is because the application 142 is asked to render a frame before the user 104 actually sees the light (and, hence, the image) on the display panel(s) 108. Accordingly, a next frame can be rendered based on this future prediction of head position and/or orientation that was made at an earlier point in time. Rotation data provided by the head tracking system 120 can be used to determine both direction of HMD 102 rotation, and amount of HMD 102 rotation in any suitable unit of measurement. For example, rotational direction may be simplified and output in terms of positive or negative horizontal and positive or negative vertical directions, which correspond to left, right, up, and down. Amount of rotation may be in terms of degrees, radians, etc. Angular velocity may be calculated to determine a rate of rotation of the HMD 102.

In the illustrated implementation, the host computer 106 includes the aforementioned processor(s) 128, which may include one or more GPUs 132, as well as the memory 130 storing the operating system 138, the video game client 134 running the application(s) 142, and the user mode driver 136 that are executable by the processor(s) 128, and the communications interface(s) 148 including the WNIC 146.

The memory 130 may further store one or more video games, such as the video game 142(1), within a video game library 924. These video games may be retrieved and executed by loading the video game client 134. In an example, a user 104 may choose to play one of multiple video games they have purchased and downloaded to the video game library 924 by loading the video game client 134 and selecting a video game 142(1) to start execution of the video game 142(1). The video game client 134 may allow users to login to a video game service using credentials (e.g., a user account, password, etc.).

The host computer 106 may further include the communications interface(s) 148 including, without limitation, the WNIC 146, which may include one or more antennas 928 to facilitate a wireless connection to a network and/or to a second device, such as the HMD 102. The WNIC 146 may implement one or more of various wireless technologies, such as Wi-Fi, Bluetooth, radio frequency (RF), and so on. It is to be appreciated that the host computer 106 may further include physical ports to facilitate a wired connection to a network and/or a second device, such as the HMD 102 or another type of display device, such as the portable game device 802.

Generally, the host computer 106 has input devices 930 and output devices 932. The input devices 930 may a keyboard, keypad, mouse, touch screen, joystick, control buttons, microphones, cameras, and the like. The output devices 932 may include, without limitation, a display(s), a light element (e.g., LED), a vibrator to create haptic sensations, a speaker(s) (e.g., headphones), and/or the like.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:
1. A host computer comprising:
a wireless network interface controller;
a processor; and
memory storing a user mode driver for the wireless network interface controller and computer-executable instructions that, when executed by the processor, cause the host computer to:
execute the user mode driver in user mode of the host computer to configure the wireless network interface controller to:

broadcast data packets without waiting for acknowledgement from a display device, and
refrain from retransmitting the data packets unless retransmission is requested by the display device;
execute a graphics-rendering application to render a frame of a series of frames; and
transmit, via the wireless network interface controller to the display device, one or more data packets carrying pixel data for the frame.

2. The host computer of claim 1, wherein the computer-executable instructions, when executed by the processor, further cause the host computer to compress the pixel data to obtain compressed pixel data.

3. The host computer of claim 2, wherein the computer-executable instructions, when executed by the processor, further cause the host computer to encode the compressed pixel data using a Forward Error Correction (FEC) algorithm.

4. The host computer of claim 1, wherein the computer-executable instructions, when executed by the processor, further cause the host computer to:
receive, from the display device, a request to retransmit a particular data packet of the one or more data packets; and
retransmit, via the wireless network interface controller to the display device, the particular data packet.

5. The host computer of claim 1, wherein the wireless network interface controller comprises multiple antennas, wherein the one or more data packets comprises multiple data packets, and wherein transmitting the one or more data packets comprises:
transmitting a first data packet of the multiple data packets using a first subset of the multiple antennas; and
transmitting a second data packet of the multiple data packets using a second subset of the multiple antennas.

6. The host computer of claim 1, wherein the computer-executable instructions, when executed by the processor, further cause the host computer to:
determine an amount of the pixel data to be carried in one or more payloads of the one or more data packets; and
set a modulation and coding scheme (MCS) rate based at least in part on the amount of the pixel data,
wherein the one or more data packets are transmitted in accordance with the MCS rate.

7. The host computer of claim 1, wherein the graphics-rendering application comprises a virtual reality (VR) video game, and wherein the display device comprises a head-mounted display (HMD).

8. The host computer of claim 1, wherein the wireless network interface controller comprises a Universal Serial Bus (USB) wireless adapter coupled to the host computer via a USB port of the host computer.

9. A method comprising:
executing a user mode driver in user mode of a host computer to configure a wireless network interface controller of the host computer to:
broadcast data packets without waiting for acknowledgement from a display device, and
refrain from retransmitting the data packets unless retransmission is requested by the display device;
receiving, via the wireless network interface controller, data from the display device;
rendering, by a graphics-rendering application executing on the host computer, and based at least in part on the data, a frame of a series of frames; and
transmitting, via the wireless network interface controller to the display device, one or more data packets carrying pixel data for the frame.

10. The method of claim 9, further comprising compressing the pixel data to obtain compressed pixel data.

11. The method of claim 10, further comprising encoding the compressed pixel data using a Forward Error Correction (FEC) algorithm.

12. The method of claim 9, wherein the wireless network interface controller comprises multiple antennas, wherein the one or more data packets comprises multiple data packets, and wherein the transmitting of the one or more data packets comprises:
transmitting a first data packet of the multiple data packets using a first subset of the multiple antennas; and
transmitting a second data packet of the multiple data packets using a second subset of the multiple antennas.

13. The method of claim 9, further comprising:
determining an amount of the pixel data to be carried in one or more payloads of the one or more data packets; and
setting a modulation and coding scheme (MCS) rate based at least in part on the amount of the pixel data,
wherein the one or more data packets are transmitted in accordance with the MCS rate.

14. The method of claim 9, wherein the transmitting of the one or more data packets comprises transmitting an Aggregated MAC Protocol Data Unit (A-MPDU) packet with a subframe that is missing or unusable by the display device.

15. The method of claim 9, wherein the display device comprises a head-mounted display (HMD), and wherein the data received from the display device comprises head tracking data.

16. The method of claim 9, further comprising at least one of:
operating the wireless network interface controller at a receive (Rx) gain of −9 decibels relative to isotropic (dBi) or less; or
operating the wireless network interface controller at a transmit (Tx) power of 20 decibels per milliwatt (dBm) or less.

17. A display device comprising:
one or more display panels;
a wireless network interface controller;
a processor; and
memory storing computer-executable instructions that, when executed by the processor, cause the display device to:
transmit, via the wireless network interface controller to a host computer executing a graphics-rendering application, data for use by the graphics-rendering application to render a frame of a series of frames;
receive, via the wireless network interface controller from the host computer, one or more received data packets carrying pixel data for the frame;
determine that at least one data packet carrying additional pixel data for the frame was not received from the host computer;
reconstruct the additional pixel data using a Forward Error Correction (FEC) algorithm based at least in part on the pixel data received in the one or more received data packets; and
present an image on the one or more display panels based at least in part on the additional pixel data reconstructed using the FEC algorithm.

18. The display device of claim 17, wherein the computer-executable instructions, when executed by the processor, further cause the display device to:
- determine that a number of the one or more received data packets is less than a threshold number;
- transmit, via the wireless network interface controller to the host computer, a request to retransmit a missing data packet; and
- receive, via the wireless network interface controller from the host computer, a retransmitted data packet corresponding to the missing data packet, the retransmitted data packet carrying at least some of the pixel data for the frame,
- wherein reconstructing the additional pixel data is further based on the at least some of the pixel data received in the retransmitted data packet.

19. The display device of claim 17, wherein a first number of antennas of the display device is greater than a second number of spatial streams that a second wireless network interface controller of the host computer is configured to utilize.

20. The display device of claim 17, wherein the display device comprises a head-mounted display (HMD), wherein the data transmitted to the host computer comprises head tracking data, and wherein the computer-executable instructions, when executed by the processor, further cause the display device to:
- apply re-projection adjustments to the pixel data received in the one or more received data packets and to the additional pixel data reconstructed using the FEC algorithm to obtain a modified reconstructed frame,
- wherein the image is presented based at least in part on the modified reconstructed frame.

* * * * *